United States Patent
Burge et al.

(10) Patent No.: US 11,645,875 B2
(45) Date of Patent: May 9, 2023

(54) MULTISPECTRAL ANOMALY DETECTION

(71) Applicant: NOBLIS, INC., Reston, VA (US)

(72) Inventors: Mark J. Burge, Falls Church, VA (US); Jordan Cheney, Vienna, VA (US)

(73) Assignee: NOBLIS, INC., Reston, VA (US)

( * ) Notice: Subject to any disclaimer, the term of this patent is extended or adjusted under 35 U.S.C. 154(b) by 70 days.

(21) Appl. No.: 17/314,327

(22) Filed: May 7, 2021

(65) Prior Publication Data

US 2021/0279491 A1 Sep. 9, 2021

Related U.S. Application Data

(63) Continuation of application No. 16/103,098, filed on Aug. 14, 2018, now Pat. No. 11,003,933.

(Continued)

(51) Int. Cl.
*G06V 40/40* (2022.01)
*G06K 9/62* (2022.01)
(Continued)

(52) U.S. Cl.
CPC .......... *G06V 40/40* (2022.01); *G06K 9/6215* (2013.01); *G06V 10/143* (2022.01);
(Continued)

(58) Field of Classification Search
CPC .... G06V 40/40; G06V 10/751; G06V 10/143; G06K 9/6215
See application file for complete search history.

(56) References Cited

U.S. PATENT DOCUMENTS

| 8,345,936 B2 | 1/2013 | Burge et al. |
| 2008/0025579 A1* | 1/2008 | Sidlauskas ........... G06K 9/6234 382/192 |

(Continued)

OTHER PUBLICATIONS

Bernhard, J. et al. "Near-IR to Visible Light Face Matching: Effectiveness of Pre-Processing Options for Commercial Matchers," Proc. of 7th IEEE International Conference on Biometrics Theory, Applications and Systems (BTAS), Sep. 2015; Arlington, VA, 8 pages.

(Continued)

*Primary Examiner* — David Perlman
(74) *Attorney, Agent, or Firm* — Morrison & Foerster LLP

(57) ABSTRACT

Techniques for detecting anomalies in multispectral image data, and more specifically for detecting presentation attacks by using multispectral image data in biometric security applications, are provided. In some embodiments, a system may receive multispectral image data and generate an estimation of a first image of a plurality of images of the multispectral image data, wherein the estimation is based on other images of the multispectral image data, but not the first image itself. The estimation may then be compared to the first image to generate an indication as to whether the multispectral image data represents a presentation attack. In some embodiments, a system may receive multispectral training image data and may extract features from the data to generate and store a network architecture for predicting relationships of multispectral images of subjects.

11 Claims, 8 Drawing Sheets

Related U.S. Application Data

(60) Provisional application No. 62/545,619, filed on Aug. 15, 2017.

(51) Int. Cl.
  *G06V 10/143* (2022.01)
  *G06V 10/75* (2022.01)
  *G06V 40/16* (2022.01)

(52) U.S. Cl.
  CPC ......... *G06V 10/751* (2022.01); *G06K 9/6255* (2013.01); *G06V 40/172* (2022.01)

(56) References Cited

U.S. PATENT DOCUMENTS

| | | | | |
|---|---|---|---|---|
| 2009/0245591 | A1* | 10/2009 | Rowe | G06V 10/143 382/115 |
| 2017/0091550 | A1 | 3/2017 | Feng | |
| 2018/0285668 | A1* | 10/2018 | Li | G06V 40/172 |
| 2020/0320718 | A1* | 10/2020 | Pelz | G06V 40/193 |

OTHER PUBLICATIONS

Burge et al., U.S. Notice of Allowance dated Jan. 12, 2021, directed to U.S. Appl. No. 16/103,098; 10 pages.

Chen, L. et al. (2016). "Invariant Descriptor Learning Using a Siamese Convolutional Neural Network," ISPRS Annals of the Photogrammetry, Remote Sensing and Spatial Information Sciences III(3): 11-18.

Cohen, N. et al. (2015). "On the Expressive Power of Deep Learning: A Tensor Analysis," 29th Annual Conference on Learning Theory, Jun. 2016, New York City, NY; 25 pages.

DeCann, B. et al. "A Novel Region Based Liveness Detection Approach for Fingerprint Scanner," Proc. of 3rd International Conference on Advances in Biometrics, Jun. 2009, Alghero, Italy; 10 pages.

He, K. et al. (2015). "Deep Residual Learning for Image Recognition," Microsoft Research; 12 pages.

Kim, Y. et al. (2009). "Masked Fake Face Detection Using Radiance Measurements." Journal of the Optical Society of America 26(4): 760-766.

Kose, N. "Reflectance Analysis Based Countermeasure Technique to Detect Face Mask Attacks," Proc. of 18th International Conference on Digital Signal Processing; Jul. 2013, Santorini, Greece; 6 pages.

Nixon, K. et al. 2005. "Multispectral Fingerprint Imaging for Spoof Detection." Proc. of SPIE 5779: 214-25.

Ross, A. et al. "Exploring Multispectral Iris Recognition Beyond 900 Nm," Proc. of 3rd IEEE International Conference on Biometrics: Thoery, Applications and Systems (BTAS), Sep. 2009, Washington, DC; 8 pages.

Simpson, C. et al. (1998). "Near-Infrared Optical Properties of ex vivo Human Skin and Subcutaneous Tissues Measured Using the Monte Carlo Inversion Technique," Physics in Medicine and Biology 43: 4265-78.

Zagoruyko, S. et al. "Learning to Compare Image Patches via Convolutional Neural Networks," Proceedings of the IEEE Conference on Computer Vision and Pattern Recognition, Jun. 2015, Boston, MA; 9 pages.

\* cited by examiner

MULTISPECTRAL ANOMALY DETECTION

CROSS-REFERENCE TO RELATED APPLICATIONS

This application is a continuation application of U.S. application Ser. No. 16/103,098, entitled, "MULTISPECTRAL ANOMALY DETECTION," filed Aug. 14, 2018, which claims the benefit of U.S. Provisional Application No. 62/545,619, entitled, "MULTISPECTRAL ANOMALY DETECTION," filed Aug. 15, 2017, the entire contents of each of which are incorporated herein by reference.

FIELD OF THE INVENTION

This relates generally to image analysis and, more specifically, to anomaly detection in multispectral image analysis that may be used to detect presentation attacks.

BACKGROUND OF THE INVENTION

Automated image analysis is used in fields ranging from biometric authentication to imagery intelligence. Particularly in security-based applications, automated image analysis systems are subjected to presentation attacks in which a subject (e.g., a person, an object, or any other subject matter of an image analyzed by the system) is presented to the system in an attempt to subvert the intended policy of the system; for example, a person wearing a makeup, prosthetics, a wig, false facial hair, or other forms of disguise may present their disguised image to a biometric security system in an attempt to avoid accurate identification and/or to achieve a false identification as another person.

In facial biometrics, there are many different types of facial presentation attacks. The simplest are print or replay attacks, where a photo or video of the subject is presented to the system. More sophisticated facial presentation attacks may include the use of three-dimensional masks, plastic surgery, and/or prosthetic makeup.

In iris biometrics, presentation attacks may involve obfuscation of biometric information or presentation of an alternative biometric signature. Iris obfuscation refers to deliberate manipulation of the iris pattern by an individual who is attempting to avoid recognition (e.g., production of a non-match from the matching algorithm) and, for example, can be implemented with a patterned contact lens. Iris impersonation refers to the duplication of the iris pattern of another individual in order to impersonate that individual (produce a match to a different individual) and, again, can be implemented with contact lenses with someone else's iris pattern printed onto them. Obfuscated and impersonated irises can be created by patterning contact lenses with either random patterns or with the iris pattern of another individual. Another simple type of iris presentation attack is to present a high-quality image of video of a person's irises to an iris imaging system.

In fingerprint biometrics, presentation attacks can also involve obfuscation and/or impersonation. Fingerprint obfuscation refers to deliberate manipulation of the fingerprint pattern by an individual who is attempting to avoid recognition (e.g., produce a non-match from the matching algorithm). Fingerprint impersonation refers to the duplication of the fingerprint texture of another individual in order to impersonate that individual (e.g., production of a match to a different individual). Duplicated fingerprints may be referred to as "spoof artifacts" or "spoofs." Obfuscated fingerprints may be created by burning, cutting, abrading, or surgically removing skin from the fingertip. Other obfuscation methods include partial occlusion of ridge detail with contaminants such as glue or paint or the use of an adhesive to bind hair or fine threads to fingers. Even partial obfuscation of just one finger where LI ridge detail (pattern flow) interpretation is modified from a whorl to a loop, or from an ulnar loop to a radial loop, may defeat watchlist matching in most large-scale AFIS processes because such systems rely on Li binning (filtering) to greatly reduce the portion of the database to be searched. Fingerprint impersonation attacks may utilize a printed fingerprint image or a molded or cast likeness of a fingerprint.

Because of the prevalence of presentation attacks, various presentation attack detection ("PAD") systems and techniques are known in the art, including PAD systems that leverage image analysis to attempt to visually recognize presentation attacks. PAD systems, and image analysis systems in general, may in some embodiments capture and analyze multispectral image data. Multispectral imaging is the method of imaging an object of interest across multiple wavelengths. In contrast to conventional images, which generally represent an integrated response of a single sensor over a wide range of bands in the same spectral zone (e.g., visible light), multispectral sensors can be more sensitive since they measure the response within a narrow spectral band. Multispectral imaging may provide rich information that is unavailable via conventional wide-band imaging. As used herein, multispectral image data may refer to any image data in which a single subject is represented in multiple images at different wavelength ranges. For example, multiple images of a single subject may be captured at two or more wavelength ranges that may include an ultraviolet range (UV), a visible light range (VIS), a near-infrared range (NIR), a short-wave infrared range (SWIR) and/or a long-wave infrared range (LWIR). In some embodiments, more or fewer distinct ranges may be used in a multispectral imaging system, and the ranges used may have an increased or decreased wavelength range (e.g., by capturing wavelengths from more than one of the ranges recited above, or by only capturing wavelengths from a portion of one of the ranges recited above).

Multispectral image data may allow for certain presentation attacks to be detected by analyzing image data at particular wavelength ranges, even when the particular presentation attack may not be detectable from image data of one or more other wavelength ranges. For example, common iris presentation attacks are undetectable in NIR images but may be detected in images at other wavelengths. However, certain presentation attacks may be undetectable at each wavelength range of a multispectral PAD system, such that images of the presentation attack from each and every wavelength range of the PAD system may not individually exhibit any anomalous characteristics sufficient to trigger the PAD system to recognize the presentation attack.

Furthermore, while PAD systems may be generally effective at detecting presentation attacks in which one or more characteristics of the presentation attacks is known from previous data, PAD systems may remain vulnerable to presentation attacks that are not previously known to the system and/or to its operators. For example, a PAD system may be configured to recognize one or more characteristics of a known presentation attack that distinguish the known presentation attack from image subjects that do not violate system policies but may have no basis on which to recognize the characteristics of a new or unknown kind of presentation attack.

SUMMARY OF THE INVENTION

As described above, known PAD systems may be vulnerable to presentation attacks that are not already known to the system and/or to its operators. For example, if a system has not been manually configured to recognize one or more characteristics of a presentation attack (e.g., a visual characteristic of a certain kind of makeup or prosthetic material used in the presentation attack), then the PAD may be ineffective at recognizing the presentation attack. Similarly, if a PAD system is configured via supervised machine learning, then the system may become effective at recognizing anomalous characteristics of known kinds of presentation attacks (e.g., known contraband materials, known spoof materials, known disguise materials, etc.); however, PAD systems trained in such a manner may remain ineffective at recognizing the presence of a presentation attack that uses a novel material or configuration, as the PAD system may not be configured to recognize the specific anomalous visual characteristics of the novel presentation attack on which it has not been trained.

As further described above, certain presentation attacks may be undetectable at one or more (or all) individual wavelength ranges of a multispectral PAD system, such that analysis of any one image of the presentation attack may fail to identify the presentation attack.

Accordingly, there is a need for improved systems, methods, and techniques for detecting anomalies in image data, and specifically for detecting presentation attacks by the image analyses of PAD systems. More specifically, there is a need for improved systems, methods, and techniques for detecting anomalies in image data when the anomalous characteristic(s) of the image data have not been previously known to or processed by a system or its operators; in the field of PAD systems, there is a need for improved PAD systems that are capable of recognizing novel presentation attacks on which the PAD system has not been specifically trained. Furthermore, there is a need for improved systems, methods, and techniques for detecting anomalies in image data by analyzing multiple images of the same subject at different wavelength ranges together, such that identifying characteristics of normal and anomalous relationships between two or more images of the same subject at different wavelength ranges may be learned and applied in order to identify anomalous inter-wavelength relationships that may indicate the presence of a presentation attack. This kind of collective analysis of multiple images of the same subject at different wavelength ranges may be referred to as cross-spectral analysis.

Described herein are systems, methods, and techniques that address these needs. In some embodiments, a system is provided that may extract features and develop statistical models from multispectral training image data. As described below, the system may use convolutional neural networks (CNNs), Gabor wavelet filter banks, and Hierarchical Part-bases TensorFaces (HPBT) dictionaries in order to extract features from the multispectral training image data, and the features extracted may be used to create statistical models for predicting expected (e.g., normal, non-anomalous) appearances of images of subjects at various wavelength ranges (and for modeling the relationships of the various images at different wavelengths of the same subject). As described below, the system training may be supervised and/or unsupervised.

After the statistical models have been developed, the system may be configured to analyze multispectral query data in order to determine whether the query data likely represents an anomaly (e.g., a presentation attack) or not. The statistical models may be configured to determine a likelihood that an image at one wavelength range is consistent with another image of the same subject at a different wavelength range. Furthermore, the statistical models may be configured to generate an image that estimates the most likely appearance of a non-anomalous subject at one wavelength range based on the image data of the subject at all other wavelength ranges. This generated image may be referred to as a "hallucinated image." The system may further be configured to compare the hallucinated image to (a) the individual images at each other specific wavelength range used to produce it and (b) the actual image at the wavelength range that the hallucinated image approximates. One or both of these comparisons may then be analyzed in order to determine a likelihood that the subject is anomalous (e.g., that the subject represents a presentation attack).

In some embodiments, a first method is providing, wherein the first method is for detecting a presentation attack in biometric security, the first method comprising: at a system comprising one or more processors and a memory: receiving multispectral image data comprising a plurality of images of a subject, wherein each of the plurality of images is an image of the subject at a different wavelength range; generating an estimation of a first image of the plurality of the images of the subject, wherein the estimation is generated based on a subset of the plurality of the images of the subject not containing the first image; comparing the first image to the generated estimation of the first image; and generating, in accordance with the comparison of the first image to the generated estimation of the first image, an indication as to whether the multispectral image data represents a presentation attack.

In some embodiments of the first method, generating the estimation of the first image comprises processing the subset of the plurality of images in accordance with one or more statistical models that model the relationships of images of a subject at different wavelength ranges.

In some embodiments of the first method, generating the estimation of the first image comprises processing the subset of the plurality of images through a semantic space of an auto-encoder comprising one or more convolutional neural networks.

In some embodiments of the first method, the comparison of the first image to the generated estimation of the first image is performed in accordance with one or more statistical models that model the relationships of images of a subject at different wavelength ranges.

In some embodiments of the first method, comparing the first image to the generated estimation of the first image comprises processing the first image and the generated estimation via a Siamese network trained to compare generated estimations of images with genuine images at the same wavelength range, and wherein the comparing further comprises generating a first similarity metric.

In some embodiments of the first method, comparing the first image to the generated estimation of the first image comprises processing the first image and the generated estimation using one or more face-recognition tools.

In some embodiments of the first method, comparing the first image to the generated estimation of the first image comprises processing the first image and the generated estimation using one or more image differencing techniques.

In some embodiments of the first method, the one or more statistical models are generated based on a plurality of features extracted from a training data set comprising multispectral image data depicting a plurality of training subjects having a same modality as the subject.

In some embodiments of the first method, extracting the plurality of features from the training data set comprises dividing images in the multispectral training data into a plurality of regional patches.

In some embodiments of the first method, extracting the plurality of features from the training data set comprises training one or more convolutional neural networks to characterize texture and structure in multispectral image data.

In some embodiments of the first method, extracting the plurality of features from the training data set comprises using a layer of a classifier network as a feature vector.

In some embodiments of the first method, extracting the plurality of features from the training data set comprises using a wavelet filter bank comprising a plurality of filters.

In some embodiments of the first method, extracting the plurality of features from the training data set comprises using a subset of the plurality of filters that has been determined to optimize performance for a predetermined combination of wavelength ranges.

In some embodiments of the first method, extracting the plurality of features from the training data set comprises extracting the features using tensor dictionaries containing multilinear mappings over a set of vector spaces.

In some embodiments of the first method, the multilinear mappings are hierarchical part-based tensorfaces.

In some embodiments of the first method, the first method further comprises, in accordance with a determination that the multispectral image data represents a presentation attack, generating and displaying a spatial representation indicating one or more regions of the first image that have been determined to be associated with the presentation attack.

In some embodiments of the first method, the spatial representation is an overlay configured to be displayed with a visible light wavelength range image of the subject.

In some embodiments of the first method, the spatial representation is a heat map.

In some embodiments of the first method, the first method further comprises: comparing a second image of the plurality of images to a third image of the plurality of images; and estimating a likelihood that the second and third images are attributable to an image of the same subject, wherein generating the indication as to whether the multispectral image data represents a presentation attack is performed further in accordance with the comparison of the second image to the third image.

In some embodiments of the first method, the comparison of the second image to the third image is performed in accordance with on one or more statistical models that model the relationships of images of a subject at different wavelength ranges.

In some embodiments of the first method, comparing the second image to the third image comprises processing the second and third image using a Siamese network comprising an ensemble of convolutional neural networks; and estimating the likelihood comprises generating a second similarity metric.

In some embodiments of the first method, generating an indication as to whether the multispectral image data represents a presentation attack comprises analyzing one or more similarity metrics generated based on the multispectral image data.

In some embodiments of the first method, analyzing one or more similarity metrics comprises determining whether one or more of the similarity metrics is less than a predetermined threshold amount.

In some embodiments of the first method, analyzing one or more similarity metrics comprises determining whether one or more of the similarity metrics differs from a different one or more of the similarity metrics by more than a threshold difference.

In some embodiments of the first method, generating an indication as to whether the multispectral image data represents a presentation attack comprises modeling the likelihood of a presentation attack as a set of Bayesian equations.

In some embodiments of the first method, the multispectral image data comprises images at a plurality of wavelength ranges comprising two or ranges selected from the set: ultraviolet range, visible light range, near-infrared range, short-wave infrared range, and long-wave infrared range.

In some embodiments, a first system is provided, wherein the first system is for detecting a presentation attack in biometric security, the first system comprising one or more processors and a memory, wherein the one or more processors are configured to execute instructions stored on the memory to cause the system to: receive multispectral image data comprising a plurality of images of a subject, wherein each of the plurality of images is an image of the subject at a different wavelength range; generate an estimation of a first image of the plurality of the images of the subject, wherein the estimation is generated based on a subset of the plurality of the images of the subject not containing the first image; compare the first image to the generated estimation of the first image; and generate, in accordance with the comparison of the first image to the generated estimation of the first image, an indication as to whether the multispectral image data represents a presentation attack.

In some embodiments, a first non-transitory computer-readable storage medium storing one or more programs is provided, the one or more programs being for detecting a presentation attack in biometric security, the one or more programs configured to be executed by one or more processors communicatively coupled to one or more processors of a system, the one or more programs including instructions to cause the system to: receive multispectral image data comprising a plurality of images of a subject, wherein each of the plurality of images is an image of the subject at a different wavelength range; generate an estimation of a first image of the plurality of the images of the subject, wherein the estimation is generated based on a subset of the plurality of the images of the subject not containing the first image; compare the first image to the generated estimation of the first image; and generate, in accordance with the comparison of the first image to the generated estimation of the first image, an indication as to whether the multispectral image data represents a presentation attack.

In some embodiments, a second method is provided, the second method being for generating network architectures for biometric security, the second method comprising: at a system comprising one or more processors and a memory: receiving multispectral training image data comprising, for each subject of a plurality of subjects, multispectral image data comprising a plurality of images of the subject, each of the plurality of images for each subject being an image at a different wavelength range; for each of the plurality of subjects, aligning the corresponding plurality of images into a respective multispectral cube representing the multispectral image data for the respective subject; extracting features from the multispectral training image data; and generating and storing, based on the extracted features, a network architecture for predicting relationships of multispectral images of a subject.

In some embodiments of the second method, extracting features from the multispectral training image data comprises dividing images in the multispectral training image data into a plurality of regional patches.

In some embodiments of the second method, extracting features from the multispectral training image data comprises training one or more convolutional neural networks trained to characterize texture and structure in multispectral image data.

In some embodiments of the second method, extracting features from the multispectral training image data comprises using a layer of a classifier network as a feature vector.

In some embodiments of the second method, extracting features from the multispectral training image data comprises using a wavelet filter bank comprising a plurality of filters.

In some embodiments of the second method, extracting features from the multispectral training image data comprises using a subset of the plurality of filters that has been determined to optimize performance for a predetermined combination of two wavelength ranges.

In some embodiments of the second method, extracting features from the multispectral training image data comprises extracting the features using tensor dictionaries containing multilinear mappings over a set of vector spaces.

In some embodiments of the second method, the multilinear mappings are hierarchical part-based tensorfaces.

In some embodiments of the second method: the network architecture comprises a Siamese network comprising an ensemble of convolutional neural networks; and the network architecture is configured to estimate a likelihood that a first image of a subject at a first wavelength range is consistent with a second image of a subject at a second wavelength range.

In some embodiments of the second method, the network architecture comprises an auto-encoder network architecture comprising a plurality of convolutional neural networks; and the network architecture is configured to generate an estimation of a first image of a subject at a first wavelength range based on a plurality of images of the subject at a respective plurality of wavelength ranges different from the first wavelength range.

In some embodiments, a second system is provided, the second system being for generating network architectures for biometric security, the second system comprising one or more processors and a memory, wherein the one or more processors are configured to execute instructions stored on the memory to cause the system to: receive multispectral training image data comprising, for each subject of a plurality of subjects, multispectral image data comprising a plurality of images of the subject, each of the plurality of images for each subject being an image at a different wavelength range; for each of the plurality of subjects, align the corresponding plurality of images into a respective multispectral cube representing the multispectral image data for the respective subject; extract features from the multispectral training image data; and generate and storing, based on the extracted features, a network architecture for predicting relationships of multispectral images of a subject.

In some embodiments, a second non-transitory computer-readable storage medium storing one or more programs is provided, the one or more programs being for generating network architectures for biometric security, the one or more programs configured to be executed by one or more processors communicatively coupled to one or more processors of a system, the one or more programs including instructions to cause the system to: receive multispectral training image data comprising, for each subject of a plurality of subjects, multispectral image data comprising a plurality of images of the subject, each of the plurality of images for each subject being an image at a different wavelength range; for each of the plurality of subjects, align the corresponding plurality of images into a respective multispectral cube representing the multispectral image data for the respective subject; extract features from the multispectral training image data; and generate and storing, based on the extracted features, a network architecture for predicting relationships of multispectral images of a subject.

Any of the features of any of the embodiments listed above and/or described elsewhere herein may be combined with one another.

DETAILED DESCRIPTION OF THE INVENTION

The following description sets forth exemplary methods, parameters, and the like. It should be recognized, however, that such description is not intended as a limitation on the scope of the present disclosure but is instead provided as a description of exemplary embodiments.

As explained above, there is a need for improved image-based anomaly detection and PAD systems that are effective at detecting previously unknown types of anomalies and/or presentation attacks and that are effective at recognizing anomalies and/or presentation attacks based on combined analysis of multiple images from different wavelength ranges.

The systems, methods, and techniques disclosed herein may address this need by extracting features from multispectral training image data using convolutional neural networks (CNNs), Gabor wavelet filter banks, and Hierarchical Part-bases TensorFaces (HPBT) dictionaries. The extracted features may then be used to create statistical models for predicting expected appearances of images of subjects at various wavelength ranges, and the models may be used to (a) determine a likelihood that an image at one wavelength range is consistent with another image of the same subject at a different wavelength range and (b) generate and analyze/compare an image that estimates the most likely appearance of a non-anomalous subject at one wavelength range based on the image data of the subject at all other wavelength ranges.

Figure 1:
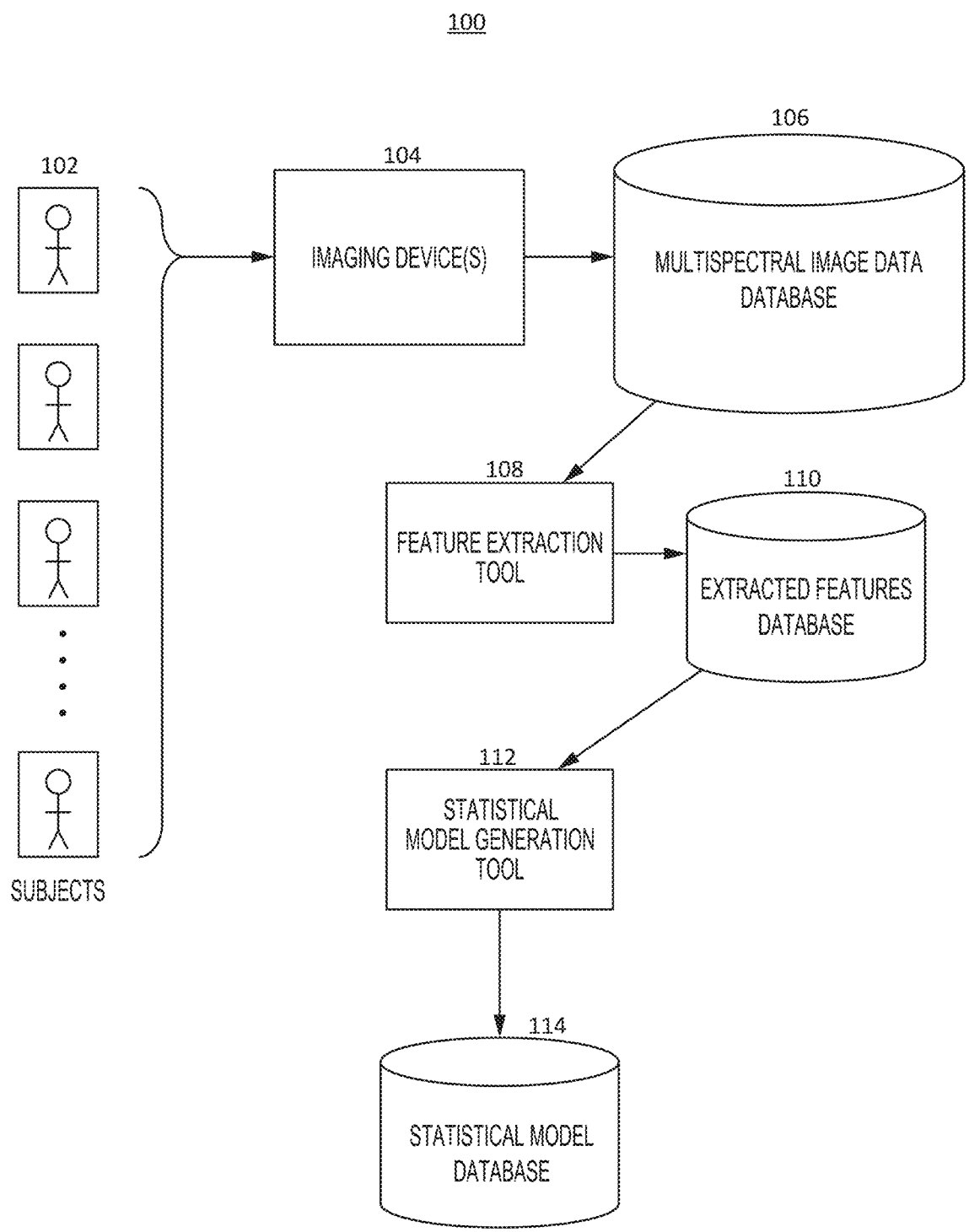
FIG. 1 shows a system for extracting features and generating statistical models from multispectral image data, in accordance with some embodiments.

FIG. 1 shows a system 100 for extracting features and generating statistical models from multispectral image data, in accordance with some embodiments. As shown, system 100 may include subjects 102, imaging device(s) 104, multispectral image data database 106, feature extraction tool 108, extracted features database 110, statistical model generation tool 112, and statistical model database 114.

System 100 may be configured such that imaging device(s) 104 capture multispectral image data for each subject 102 and transmit the multispectral image data to multispectral image data database 106 for storage. Feature extraction tool 108 may be configured to then analyze the multispectral image data stored in database 106 in order to extract features from the multispectral image data, and tool 108 may then transmit the extracted features to extracted features database 110 for storage. This process will be described in further detail below with reference to method 200 in FIGS. 2A and 2B.

In some embodiments, subjects 102 may be any subject matter of multispectral image data captured by imagine device(s) 104, and/or may be any subject matter of multispectral image data supplied to database 106 by other means. In some embodiments, subjects 102 may comprise a plurality of different subjects of the same modality (e.g., the same category of subject matter), wherein the modality may include iris data, face data, and fingerprint data. In some embodiments, subjects 102 may be categorized such that a batch of training data for each individual modality may be provided to system 100 and such that the system may develop statistical models for the specific modality.

In some embodiments, imaging device(s) 104 may comprise any one or more multispectral imaging devices, stereo rigs, or commercially available off-the-shelf imaging devices configured to capture image data at a plurality of predetermined wavelength ranges. In some embodiments, different imaging devices may be used to capture images at different wavelength ranges, and the distinct images of the same subject may thereafter be associated with one another in order to form the multispectral image data transmitted to multispectral image data database 106.

In some embodiments, multispectral image data database 106 may be any computer database, memory, or other transitory or non-transitory storage medium capable of storing digital multispectral image data. In some embodiments, the multispectral image data may be stored as spectral cubes as continuous arrays of unsigned values on disk or in a database, with or without one or more elements of associated metadata. As shown, database 106 may be communicatively coupled to imaging device(s) 104 such that it may receive multispectral image data, and it may be communicatively coupled to feature extraction tool 108 such that database 106 may provide multispectral image data to tool 108.

In some embodiments, feature extraction tool 108 may be any one or more computer processors configured to execute instructions in order to perform the feature extraction methods discussed in greater detail below with respect to method 200 in FIGS. 2A and 2B.

In some embodiments, extracted features database 110 may be any computer database, memory, or other transitory or non-transitory storage medium capable of storing features extracted from digital multispectral image data. In some embodiments, the extracted features may be stored as continuous arrays of unsigned values on disk or in a database, with or without one or more elements of associated metadata. As shown, database 110 may be communicatively coupled to feature extraction tool 108 such that it may receive extracted features, and it may be communicatively coupled to statistical model generation tool 112 such that database 110 may provide extracted features to tool 108.

In some embodiments, statistical model generation tool 112 may be any one or more computer processors configured to execute instructions in order to perform the statistical model generation methods discussed in greater detail below with respect to method 200 in FIGS. 2A and 2B.

In some embodiments, statistical model database 114 may be any computer database, memory, or other transitory or non-transitory storage medium capable of storing statistical models generated from features extracted from digital multispectral image data. As shown, database 114 may be communicatively coupled to statistical model generation tool 112 such that it may receive statistical models from tool 112.

Figure 2A:
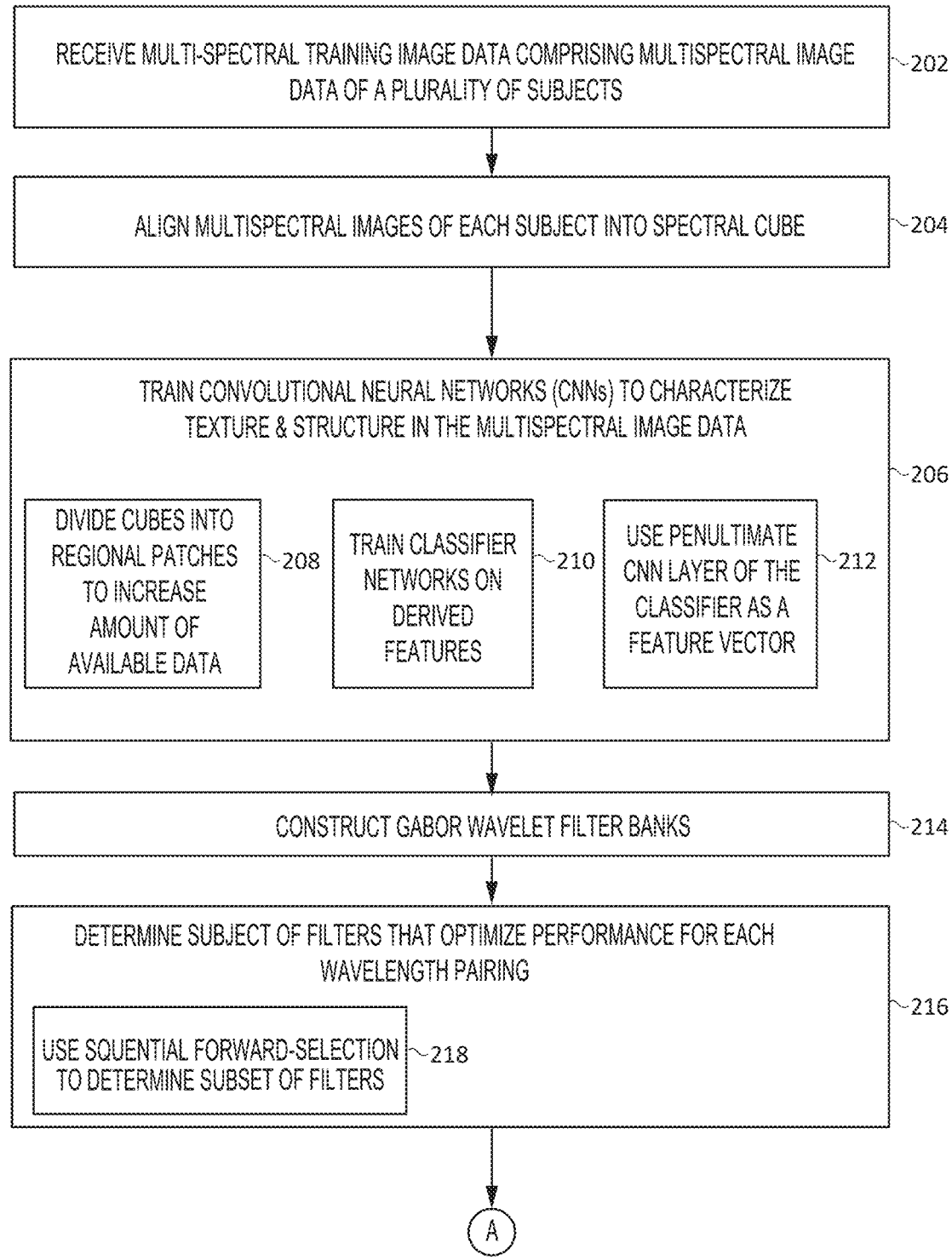
FIGS. 2A & 2B show a method for extracting features and generating statistical models from multispectral image data, in accordance with some embodiments.
Figure 2B:
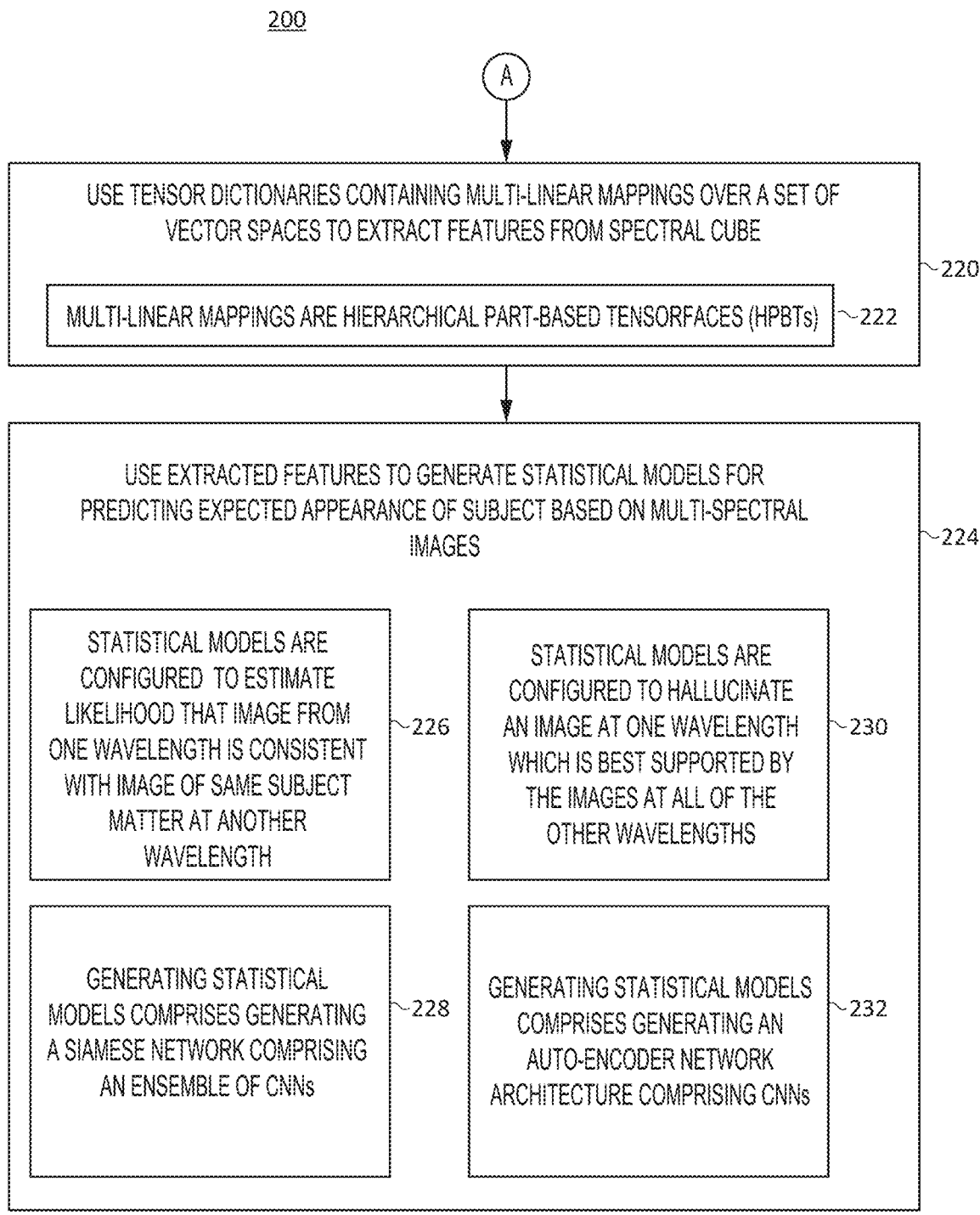

FIGS. 2A & 2B show a method 200 for extracting features and generating statistical models from multispectral image data, in accordance with some embodiments. In some embodiments, method 200 may be performed by a system, such as system 100, as described above.

At block 202, in some embodiments, the system may receive multispectral training image data comprising multispectral image data of a plurality of subjects of one modality. As described above, multispectral image data may include any image data in which a single subject is represented in multiple images at different wavelength ranges. Wavelength ranges may include UV, VIS, NIR, SWIR, LWIR, other ranges, sub-portions of any one or more of those ranges, and/or combinations of all or part of any one or more of those ranges. Modalities of the multispectral image data may include face modality, iris modality, fingerprint modality, and/or any one or more other modalities.

In some embodiments, the system may receive the multispectral training image data via an imaging device such as imaging devices 104, which may capture images of subjects 102. In some embodiments, the system may receive multispectral training image data from one or more preexisting public and/or private datasets across one or more modalities.

Exemplary face image datasets that may provide training data may include a large unconstrained dataset collected by Noblis, Inc. under the IARPA Janus program that is known as IJB-A; a range of academic datasets including YouTube-Faces for VIS video and VGG-Face and MegaFace for additional, labelled, VIS face imagery; and various GFI datasets from Notre Dame's multispectral face collections, including 2,341 VIS images (4288×2848 pixel resolution) and 22,264 NIR (4770×3177) images of 574 subjects (402 with multiple time separated collects).

Exemplary iris image datasets that may provide training data may include multispectral iris samples in the biometrics dataset collected by Noblis with the Department of Defense Biometrics Task Force.

Exemplary fingerprint image datasets that may provide training data may include the LivDet 2015 dataset, including more than 2,500 images from each of four different optical fingerprint sensors, over 10,000 images total, and including both 1000 dpi image sand 500 dpi images; fingerprints datasets captured under varying conditions, including moisture content (wet and dry) and applied pressure (high and low); fingerprint datasets, including spoof fingerprint images created by from casts using EcoFlex, a liquid variant of EcoFlex, gelatin, latex, wood glue, RTV (a two-component silicone rubber), Play-doh, Body Double, OOMOO, and/or a form of gelatin; the LivDet 2013 dataset consisting of more than 4,000 images from each of four different fingerprint sensors, including over 16,000 images total; the LivDet 2011 dataset consisting of more than 4,000 images from each of four different fingerprint sensors, over 16,000 images total; and the LivDet 2011 dataset consisting of more than 3,000 images from each of three different optical fingerprint sensors, over 9,000 images total.

In some embodiments, the multispectral training image data may wholly or partially be curated for supervised training, or it may be wholly or partially uncurated for unsupervised training. In some embodiments, the multispectral training image data may be known to include one or more examples of presentation attacks, it may be known to include no examples of presentation attacks, or the presence or absence of one or more presentation attacks in the data may be unknown.

Training data received by the system may include image data and associated metadata, wherein the associated metadata may identify a wavelength range and/or a modality of the image data, as well as identifying one or more other characteristics, such as image source, file type, time captured, etc.

In some embodiments, the data received may include and/or may accompany orthogonal data associated with the multispectral image data, which will be discussed in further detail below with reference to the orthogonal models of method 600.

At block 204, in some embodiments, the system may align the multispectral image data into spectral cubes. Multispectral data acquired or aligned to the same optical axis may be referred to as a spectral cube. Spectral cubes can be considered as a stack of on-axis slices through the cube of signals sensed at a specific wavelength. For each subject for which images are received and aligned as needed, the aligned spectral cube may serve as a common input to each of the three approaches for extracting multispectral features—CNN-based feature extraction, wavelet filter-based feature extraction, and HPBT feature extraction—discussed in greater detail below.

In some embodiments, alignment may include a two-step process; first, the locations of different landmarks (e.g., facial landmarks, fiducials) may be computed based on an input sample from the VIS wavelength range. Next, an affine transformation may be computed that defines an in-plane rotation, translation, and scaling that aligns those landmarks to a fixed set of locations. In some embodiments, alignment in the SWIR band may be performed. In some embodiments, the system may utilize template-based matching and summation range filters in order to build detectors.

In some embodiments, failure to accurately align multispectral data may decrease the performance of image analysis systems, such as PAD systems. To mitigate this risk, if alignment precision is insufficient for the learning framework, iterative regression models using local random forests may alternately or additionally be applied in order to ensure sufficient alignment.

Encapsulating multispectral data in a multispectral cube may enable the development of a set of core algorithms to extract a common set of powerful features from each modality. Below, with reference to blocks 206-220, exemplary techniques for feature extraction are explained. As discussed in more detail below, extracted features may ultimately be used by cross-spectral prediction models to detect intra- and/or inter-wavelength anomalies indicative of a presentation attack. In some embodiments, the techniques of blocks 206-220 may be performed by feature extraction tool 108 on the basis of the spectral cubes of the multispectral image data contained in database 106.

At block 206, in some embodiments, the system may train convolutional neural networks (CNNs) to characterize texture and structures in the multispectral image data. In some embodiments, the CNNs may be trained to characterize texture and structure at a plurality of different scales.

CNNs may be adept at discovering novel discriminative features in a wide range of signal domains. In biometrics, features extracted by CNNs may be powerfully discriminative. In some embodiments, the system described herein may develop CNNs to extract the information embedded in the spectral cubes. In some embodiments, one CNN may be developed per modality per wavelength range. In some embodiments, the ensemble of CNNs may be developed using supervised learning (while in some embodiments the learning may be wholly or partially unsupervised), and the CNNs may be trained to characterize the texture and structures apparent at different scales in all or part of the images from each wavelength range of the spectral cube.

At block 208, in some embodiments, training CNNs to characterize texture and structures in the multispectral image data may comprise dividing the spectral cubes into regional patches to increase the amount of available data.

In some embodiments, the system may analyze an entire image of a spectral cube at once, while in some embodiments the system may first divide the images of the spectral cube into two or more regional slices (e.g., patches) to be analyzed.

While dividing the signal up into patches may inherently increase the amount of available data, the risk of insufficient data for CNN training may be alternately or additionally mitigated, in some embodiments, by using existing training image data sets together with new data from our an active collection schedule (e.g., multispectral image data collected by image capture device(s) 104).

At block 210, in some embodiments, training CNNs to characterize texture and structures in the multispectral image data may comprise training classifier networks on derived features. At block 212, in some embodiments, training convolutional neural networks (CNNs) to characterize texture and structures in the multispectral image data comprises using a penultimate CNN layer of the a classifier network as a feature vector. In some embodiments, the dimensionality required to learn directly in the texture space may be too large for current approaches, so classifier networks may be trained on derived features and may utilize one or more forms of transfer learning that are successful in developing powerful discriminative features in face recognition. For example, the penultimate CNN layer of the classifier may be used as a feature vector.

At block 214, in some embodiments, the system may construct Gabor wavelet filter banks. Gabor wavelets may be used to extract local texture features from images in a variety of different domains and may be used in biometrics for both discriminative features and liveness detection and computer vision. Gabor wavelets may have optimal joint resolution in the spatial and frequency domains, and with appropriate parameter selection, they may be tuned for directional selectivity. Physiological features differ greatly in their appearance across wavelengths, so decomposing all wavelengths with the same 2D complex Gabor spatial filter will not expose all the useful information embedded in the signal. A complex 2D Gabor wavelet filter bank may be used, in some embodiments, to test this whether the same 2D complex Gabor spatial filter will be effective for all wavelengths or wavelength ranges. For example, a complex 2D Gabor wavelet filter bank may be used to generate a multi-resolution decomposition of aligned and normalized multispectral imagery.

At block 216, in some embodiments, the system may determine a subset of filters that optimize performance for each wavelength pairing. After constructing the per-modality filter banks, the system may determine the subset of filters that optimizes performance for given wavelength-range pairings in each modality. In some embodiments, performance may be optimized by identifying filters that yield the best results for each combination of images of different wavelength ranges in the multispectral image data. In some embodiments, if a spectral cube has n images representing n different wavelength ranges, then the system may optimize filters for each of the $$\binom{n}{2}$$

combinations images.

At block 218, in some embodiments, the system may use sequential forward-selection to determine the subset of filters. In some embodiments, especially with large data sets of multispectral image data, an exhaustive search for optimal wavelength-filter pairings may be too computationally intensive for completion in a reasonable amount of time. In some embodiments, sequential forward selection may be applied to the filter subset selection problem.

In some embodiments, the final set of filters at the termination of the filter search will be the wavelet filter bank that optimizes performance for each given wavelength-range pairing. Each of the optimized filters banks for each distinct modality (e.g., face, iris, and fingertip) may then be used for extracting features from respective spectral cubes for input to a prediction framework, as explained in greater detail below.

At block 220, in some embodiments, the system may use tensor dictionaries containing multilinear mappings over a set of vector spaces to extract features from the spectral cubes. A tensor may be defined as a multilinear mapping over a set of vector spaces. In some embodiments of the present application, a respective optimized tensor dictionary may be used for each of the modalities (e.g., face, iris, and fingerprint) to extract features from spectral cubes for input to a prediction framework (as explained in further detail below).

At block 222, the multilinear mappings of the tensor dictionaries may be Hierarchical Part-based TensorFaces (HPBTs). HPBT performs an N-mode SVD on a 4-dimensional tensor that encapsulates inter- and intra-class variation across a dataset. N-mode SVD is a "generalization" of conventional matrix (2-mode) SVD. N-mode SVD orthogonalizes N spaces and decomposes the tensor as the mode-n product, denoted, of the N-orthogonal spaces, as follows:

$$D = Z x_1 U_1 x_2 U_2 \ldots x_n U_{n'} \ldots x_N U_N$$

Tensor Z, known as the core tensor, is analogous to the diagonal singular value matrix in the conventional matrix SVD (although it no longer has a diagonal structure). The core tensor governs the interaction between the mode matrices $U_n$, for n=1 ... N. In a similar manner to deep learning, the core tensor may encode a very compact representation of a very large space, which may be critical for machine learning models to extract relevant information in a timely manner.

In some embodiments of biometrics, tensors may be used in face recognition, and HPBT may be used in multispectral data analysis, both part-by-part and globally. In some embodiments of the present application, the large amount of training data may provide the tensor with enough systematic variation to map the normal range of physiological characteristics captured in the spectral cubes.

In some embodiments, any one or more of the techniques discussed above with respect to blocks 206-220 (e.g., CNN-based feature extraction, wavelet-filter-based feature extraction, and HPBT-based feature extraction) may be applied by feature extraction tool 108 to the spectral cubes of the multispectral image data contained in database 106. Features extracted by extraction tool 108 from the spectral cubes of the multispectral image data contained in database 106 may be transmitted to and stored in extracted features database 110.

Following feature extraction, the features may be used both (a) to learn statistical models for predicting the expected appearance of a biometric sample; and (b) to fuse this information with modality-specific, orthogonally sensed, information to determine the likelihood of a presentation attack.

At block 224, in some embodiments, the system may use the extracted features (e.g., the features extracted by the CNNs, the wavelet filter bank, and/or the HPBT dictionaries) to generate statistical models for predicting an expected appearance of a subject based on the multispectral images. In some embodiments, statistical model generation tool 112 may generate the statistical models on the basis of the extracted features stored in database 110. In some embodiments, the statistical models may be configured to reflect the fact that the appearance of a subject at one wavelength has a predictable (and learnable) relationship with their appearance at other wavelengths. In some embodiments, the statistical models (e.g., cross-spectral prediction models) may have two complimentary parts: the first part may estimate the likelihood that the appearance of a subject at one wavelength range is supported by the information sensed at another wavelength range, and the second part may estimate the appearance of a subject at one wavelength range that is best supported by the underlying physiology that was actually sensed at the other wavelength ranges (this latter estimation may be referred to as "hallucination"). The first part is discussed below with respect to blocks 226 and 228, and the second part is discussed below with respect to blocks 230 and 232.

At block 226, in some embodiments, the statistical models may be configured to estimate a likelihood that an image from one wavelength range is consistent with an image of the same subject at another wavelength range. In some embodiments, the statistical models may be configured to receive, as input, two images at two predetermined wavelength ranges and to generate, as output, a similarity metric that indicates a likelihood that the two images are attributable to the same subject. In some embodiments, a low likelihood that the two images are attributable to the same subject, as indicated by the similarity metric, may indicate that the images potentially represent a presentation attack.

At block 228, in some embodiments, generating the statistical models may comprise generating a Siamese Network comprising an ensemble of CNNs. Siamese networks may consist of a pair of two independent networks connected by a shared set of weights (in neural networks, what is learned is encoded in the weights between network connections). In some embodiments, each network in the pair may receive features extracted from two different wavelength ranges and may processes the features in parallel to learn relationships between the two wavelength ranges. In some embodiments, these networks may learn relationships such those between the features extracted by Gabor wavelets from biometric images.

In some embodiments, a separate ensemble of networks may be built for each modality consisting of a network for distinct feature (e.g., a network for each of three core features) using every possible combination (e.g., unordered pairing) of wavelength ranges (for n wavelength ranges, $$\binom{n}{2}$$

networks). Then, for each modality, the ensemble of networks may be trained using supervised learning by presenting a plurality of positive and a second plurality of negative examples of multispectral image data features drawn from the training image data.

In some embodiments, the number of negative examples (e.g., samples not known to represent a presentation attack) may be significantly greater than the number of positive examples (e.g., samples known to represent a presentation attack). In some embodiments, the number of negative examples may be greater than the number of positive examples by one, two, three, four, or five or more orders of magnitude. In some embodiments, no positive examples may be used in the supervised learning process for developing the statistical models.

In some embodiments of supervised learning approaches, there may be an inherent risk that a resultant model may fail to generalize to unseen examples, such as unknown kinds of presentation attacks. In order to mitigate this risk, the generalization performance of statistical models may be iteratively evaluated using a cross-validation protocol in which the model is trained on certain types of presentation attacks and then tested on other types of presentation attacks not included in the training phase. This approach may, in some embodiments, enable the statistical models to model what is normal (rather than solely modeling what is known to be abnormal or anomalous) and to be able to determine if a novel sample is normal, rather than relying solely on the technique of modeling the larger space of abnormal samples.

At block 230, the statistical models are configured to generate an estimated image (which may be referred to as a "hallucinated image") at a predetermined wavelength range, such that the estimated image is best supported by the images at all other wavelength ranges for a subject. At block 232, generating the statistical models comprises generating an auto-encoder network architecture configured to generate the hallucinated image at the predetermined wavelength range, wherein the auto-encoder comprises CNNs.

CNN-based auto-encoders may comprise an encoder that recodes a much larger signal into more compact representations and a decoder that learns a mapping from the smaller representation back to the much larger sample. The encoder portion may be thought of as similar to a lossy compression in which an image file is compressed into a smaller representation that can then be used to create a visually smaller, less detailed version of the original image. Unlike simple compression, the compact representation learned by an auto-encoder CNN may have semantic meaning, and the decoder may learn a mapping from this semantic space back to the target domain. In some embodiments, the auto-encoder network may thus learn a more compact representation that captures underlying semantic relationships between the same features (e.g., physiology) of a person imaged at different wavelength ranges. Auto-encoders may thus be built from the features extracted from the spectral cubes, such that the auto-encoders may process images from a spectral cube at all wavelength ranges but one through the semantic space of the auto-encoder in order to generate a hallucinated image that represents a probable appearance of the subject in the single excluded wavelength range. As discussed further with reference to method 600 below, large differences between the hallucinated image and an actual image of the subject at the hallucinated wavelength range may indicate that the subject represents a presentation attack.

Figure 3:
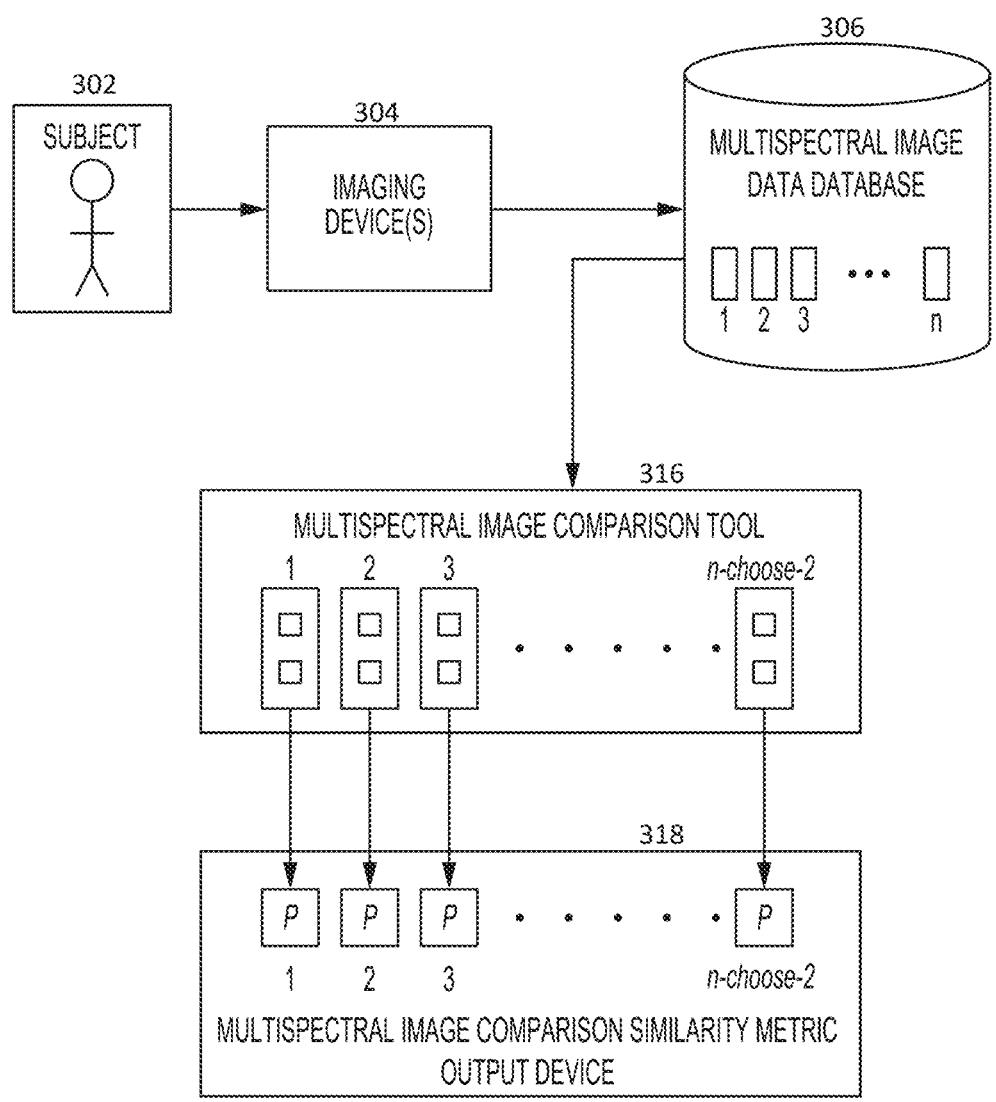
FIG. 3 shows a system for using multispectral image data to determine whether a subject of the multispectral image data represents an anomaly, in accordance with some embodiments.

FIG. 3 shows a system 300 for using multispectral image data to determine whether a subject of the multispectral image data represents an anomaly, in accordance with some embodiments. As shown, system 300 may include subject 302, imaging device(s) 304, multispectral image data database 306, multispectral image comparison tool 316, and multispectral image comparison similarity metric output device 318.

System 300 may be configured such that imaging device(s) 304 captures multispectral image data for subject 302 and transmits the multispectral image data to multispectral image data database 306 for storage. Multispectral image comparison tool 316 may be configured to then use statistical models configured to predict an expected appearance of a subject based on the multispectral images in order to compare the image data at one wavelength range with image data from the other wavelength ranges, in order to generate and/or evaluate a similarity metric in accordance with the comparison. The similarity metric, which may indicate a likelihood of an anomaly and/or a presentation attack, may be output by multispectral image comparison similarity score output device 318. This process will be described in further detail below with reference to method 400 in FIG. 4.

In some embodiments, subject 302 may be any subject matter of multispectral image data captured by imagine device(s) 304 and/or may be any subject matter of multispectral image data supplied to database 306 by other means. In some embodiments, subject 302 may share any one or more characteristics in common with any one of subjects 102, as discussed above with reference to FIG. 1. In some embodiments, a modality of subject 302 may include iris data, face data, and/or fingerprint data. In some embodiments, subject 302 may be categorized, tagged with metadata, or otherwise identifiable by system 300 such that the system 300 may identify, among other information, a modality of the subject 302.

In some embodiments, imaging device(s) 304 may comprise any one or more multispectral imaging devices, stereo rigs, or commercially available off-the-shelf imaging devices configured to capture image data at a plurality of predetermined wavelength ranges. Imaging device(s) 304 may share any one or more characteristics in common with imaging device(s) 104, as discussed above with reference to FIG. 1. In some embodiments, different imaging devices may be used to capture images at different wavelength ranges, and the distinct images of the same subject may thereafter be associated with one another in order to form the multispectral image data transmitted to multispectral image data database 306.

In some embodiments, multispectral image data database 306 may be any computer database, memory, or other transitory or non-transitory storage medium capable of storing digital multispectral image data. In some embodiments, multispectral image data database 306 and the multispectral image data stored thereon may share any one or more characteristics, respectively, with multispectral image data database 106 and the multispectral image data stored thereon as discussed above with reference to FIG. 1. As shown, database 306 may be communicatively coupled to imaging device(s) 304 such that it may receive multispectral image data, and it may be communicatively coupled to multispectral image comparison tool 316 such that database 306 may provide multispectral image data to tool 316.

In some embodiments, multispectral image comparison tool 316 may be any one or more computer processors configured to execute instructions in order to perform the image comparison methods discussed in greater detail below with respect to method 400 in FIG. 4.

As shown, tool 316 may be communicatively coupled to multispectral image comparison similarity metric output device 318 such that tool 316 may send data to output device 318 that enables output device 318 to generate one or more reports, alerts, alarms, indicators, or the like indicating one or more calculated similarity metrics, the estimated presence or absence of an anomaly, and/or the estimated presence or absence of a presentation attack. In some embodiments, output device 318 may include one or more processors, one or more transmitters (e.g., to send electronic data to other computerized components), one or more computer-readable storage mediums in which an indication may be stored, one or more displays on which an indication may be displayed, and/or one or more visual or audio indicators.

Figure 4:
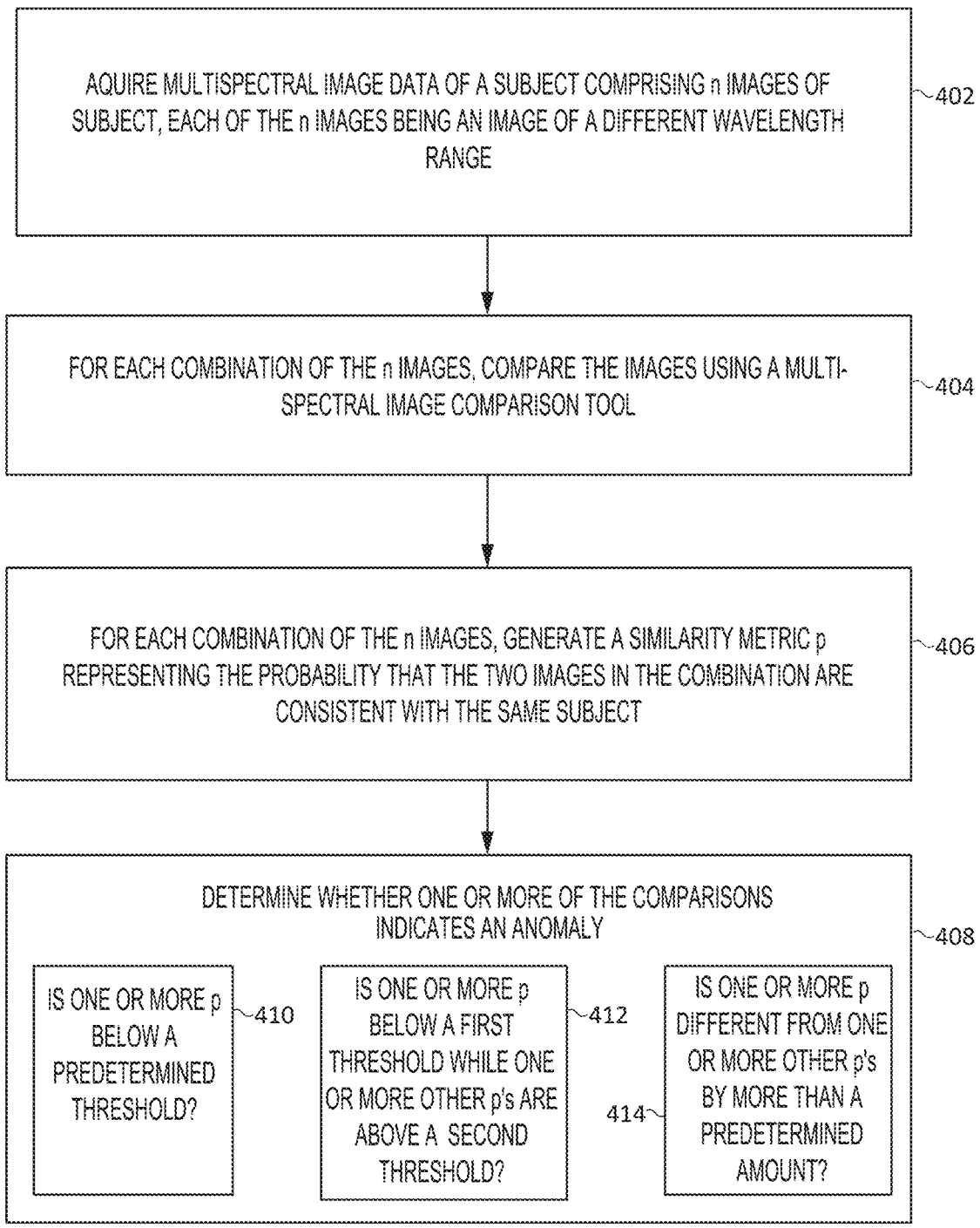
FIG. 4 shows a method for using multispectral image data to determine whether a subject of the multispectral image data represents an anomaly, in accordance with some embodiments.

FIG. 4 shows a method 400 for using multispectral image data to determine whether a subject of the multispectral image data represents an anomaly, in accordance with some embodiments. In some embodiments, method 400 may be performed by a system such as system 300 as described above. Method 400 may, in some embodiments, be referred to as a method for cross-spectral image analysis in that it may analyze multispectral data on the basis of more than one image of the same subject at different wavelength ranges at once rather than only considering the images from different wavelength ranges individually and separately.

At block 402, in some embodiments, the system may acquire multispectral image data of a subject. In the example of system 300 of FIG. 3, system 300 may acquire multispectral image data of subject 302, and the multispectral image data may be stored in database 306.

In some embodiments, the system may receive the multispectral image data via an imaging device such as imaging device(s) 304, which may capture images of subject 302. In some embodiments, the system may receive the multispectral image data from one or more preexisting public and/or private datasets or data sources.

In some embodiments, the multispectral image data received by the system may be aligned before it is received, while in some embodiments it may not be aligned before it is received. If the data is not pre-aligned when it is received by the system, then the system may align the data (e.g., align the different images comprising the multispectral image data) into an aligned spectral cube representing the multispectral image of the subject.

In some embodiments, the multispectral image data of the subject may comprise n images of the subject, wherein each of the n images are an image representing a different wavelength range.

At block 404, in some embodiments, for each combination of two of the images of the multispectral image data, the system compares the combination of two images using a multispectral image comparison tool. In the example of system 300 of FIG. 3, the combinations of images may be compared using multispectral image comparison tool 316. In some embodiments, when the multispectral image data comprises n images at different wavelength ranges, the image comparison tool may perform $$\binom{n}{2}$$

comparisons.

In some embodiments, the comparison of two of the images of the multispectral image data may comprise analyzing the two images in accordance with one or more statistical models configured to determine whether images at different wavelength ranges are consistent with images of the same subject at the different wavelength ranges for the modality of the subject being analyzed.

In some embodiments, the multispectral image analysis tool may perform the comparisons of this technique by leveraging statistical models configured to estimate a likelihood that an image from one wavelength range is consistent with an image of the same subject at another wavelength range, such as the statistical models discussed above with reference to method 200 of FIG. 2. In some embodiments, the statistical models applied to perform the comparisons discussed herein may be generated in accordance with any or all of the techniques discussed above with respect to FIG. 2.

As discussed above, the statistical models applied by the multispectral image comparison tool may be configured to receive, as input, two images at two predetermined wavelength ranges and to generate, as output, a similarity metric that indicates a likelihood that the two images are attributable to the same subject. In some embodiments, the multispectral image comparison tool may leverage one or more Siamese Networks each comprising an ensemble of CNNs. In some embodiments, the multispectral image comparison tool may store one Siamese Network for each possible combination of wavelength ranges for each modality and may use the appropriate Siamese Network to analyze the each combination of images received as input.

At block 406, in some embodiments, for each compared combination of images, the system may generate a similarity metric representing the probability that the two images in the combination are attributable to the same subject. In some embodiments, the multispectral image comparison tool may, in accordance with each comparison by the Siamese Networks, generate a respective similarity metric as output, wherein each similarity metric indicates the likelihood that the two compared input images are attributable to the same subject. In some embodiments, the similarity metric may be a probability between 0 and 1. In some embodiments, one or more of the similarity metrics may be transmitted to a multispectral image comparison similarity score output device, such as device 318 of system 300, for output, transmission, and/or display.

In some embodiments, the output similarity metric may be used as a trigger or condition for causing the system to take one or more actions, such as generating, transmitting, or outputting an alert; automatically executing further analysis; or storing data regarding the corresponding subject. Below, various techniques are discussed by which the system may use the similarity metric to determine whether the subject likely represents an anomaly or a presentation attack. In some embodiments, determining that the subject likely represents an anomaly or a presentation attack may trigger any of the actions discussed above, such as generating, transmitting, or outputting an alert.

At block 408, in some embodiments, the system may determine whether any one or more of the comparisons indicates an anomaly. In some embodiments, determining that an anomaly is indicated may comprise determining that the multispectral image data represents a presentation attack. In some embodiments, the system may automatically determine whether any one or more of the comparisons indicates an anomaly on the basis of one or more of the generated similarity metrics.

At block 410, in some embodiments, determining whether an anomaly is indicated comprises determining whether any similarity metric is less than a predetermined threshold. For example, if a similarity metric indicating likelihood of matching of the two images is sufficiently low, then the system may determine that the two images are inconsistent and thereby represent an anomaly and/or a presentation attack. [Do you know what the absolute threshold could be set to? What kind of certainties does the system return? How low does a value have to be before it is suspicious?]

At block 412, in some embodiments, determining whether an anomaly is indicated comprises determining whether a first similarity metric is less than a first threshold and whether a second similarity metric is greater than a second threshold. In some embodiments, the mere existence of one similarity metric falling below a predetermined threshold may not be considered sufficient to indicate the likely presence of an anomaly and/or presentation attack. For example, when many or all of the similarity metrics for a single spectral cube (e.g., hose corresponding to many or all of the plurality of inter-wavelength-range comparisons) are lower than usual (e.g., all are below a predetermined threshold), it may be the case that the system has produced an error and/or that the statistical model has a flaw that has caused the analysis of the multispectral image data to produce unreliable results.

Accordingly, in some embodiments, a system may be configured to determine that an anomaly is indicated only when a similarity metric for one pair-wise comparison for a subject indicates a low confidence of a match while one or more other similarity metrics for one or more other pair-wise comparisons of the same subject simultaneously indicates high confidence of a match. In these cases, the high confidence of one or more similarity metrics may indicate that the statistical models are generally accurate and effective at analyzing the multispectral image data of the subject, while the anomalous low confidence of at least one similarity metric may indicate the presence of a genuine anomaly and/or presentation attack detectable only by certain cross-spectral comparisons.

In some embodiments, this and similar techniques may account for the possibility that similarity scores may be more meaningful when analyzed relative to each other. In some embodiments, a relevant threshold may be determined by normalizing metrics to a meaningful range (e.g., 0-1), or a system may be run on a known dataset and an operating point that gives satisfactory results on that dataset may be selected. In some embodiments, thresholds may also be adjusted and analyzed in accordance with application (e.g., a level of security of the application, such that an application for granting access to a classified building may have a different threshold than an application for border security for a country). In some embodiments, if a test dataset is representative of a use case of the system, then certainties from a test dataset (e.g., one false positive per 10,000; 100,000; 1,000,000; etc. samples) may be mapped to an operationally deployed system, including in using these certainties to set one or more thresholds used to determine whether a result represents an anomaly.

At block 414, in some embodiments, determining whether an anomaly is indicated may comprise determining whether a first similarity metric differs from a second similarity metric by more than a predetermined threshold difference. In a similar manner as discussed above with respect to block 412, uniform low similarity metrics may indicate a flaw in the design of the system and/or one or more of the statistical models being used to perform cross-spectral analysis. Thus, recognizing when one or more cross-spectral comparisons indicate substantially different probabilities for matching may be an effective indicator of a genuine anomaly and/or presentation attack detectable only by certain cross-spectral comparisons.

Figure 5:
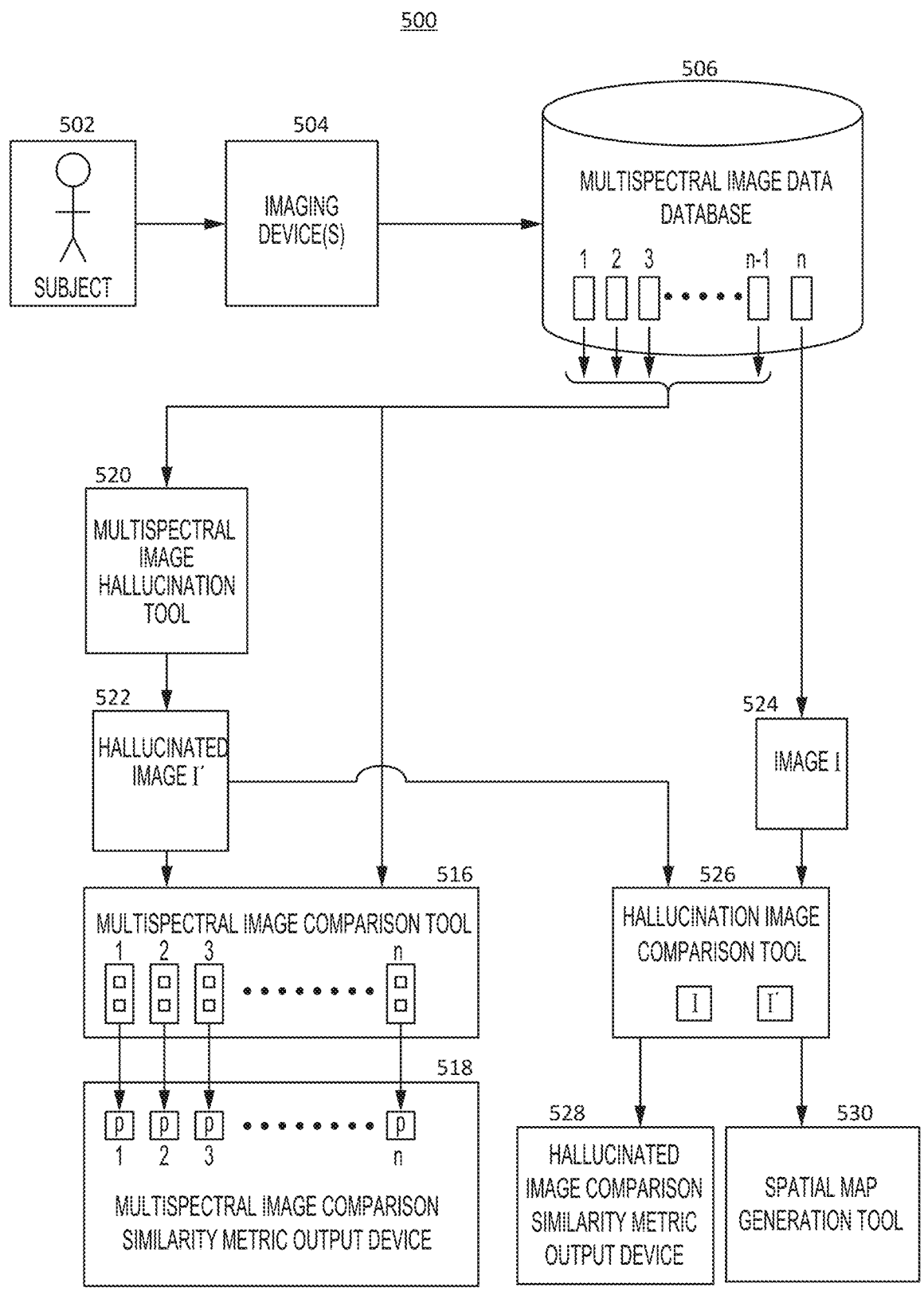
FIG. 5 shows a system for using multispectral image data to determine whether a subject of the multispectral image data represents an anomaly, in accordance with some embodiments.

FIG. 5 shows a system 500 for using multispectral image data to determine whether a subject of the multispectral image data represents an anomaly, in accordance with some embodiments.

As shown, system 500 may include subject 502, imaging device(s) 504, multispectral image data database 506, multispectral image comparison tool 516, multispectral image comparison similarity metric output device 518, multispectral image hallucination tool 520, hallucinated image 522, image 524, hallucinated image comparison tool 526, hallucinated image similarity metric output device 528, and spatial map generation tool 530.

System 500 may be configured such that imaging device(s) 504 capture multispectral image data for subject 502 and transmits the multispectral image data to multispectral image data database 506 for storage. Multispectral image hallucination tool 520 may be configured to then use statistical models to generate hallucinated image 522 of the subject based on the images at all wavelength ranges but one, where hallucinated image 522 predicts the expected appearance of the subject at the remaining wavelength range.

Multispectral image comparison tool 516 may be configured to then use statistical models configured to predict an expected appearance of a subject based on the multispectral images to compare hallucinated image 522 with the image data from each of the other wavelength ranges in order to generate and/or evaluate one or more similarity metrics in accordance with the comparisons. The similarity metrics, which may indicate a likelihood of an anomaly and/or a presentation attack, may be output by multispectral image comparison similarity score output device 518.

Alternately or additionally, hallucinated image comparison tool 526 may be configured to compare hallucinated image 522 to image 524, where image 524 corresponds to the same wavelength range that is predicted by hallucinated image 524. Hallucinated image comparison tool 526 may generate and/or evaluate a similarity metric in accordance with the comparison and may further generate a spatial map. The similarity metric, which may indicate a likelihood of an anomaly and/or a presentation attack, may be output by hallucinated image comparison similarity metric output device 528, and the spatial map may be output by spatial map generation tool 530.

This process will be described in further detail below with reference to method 600 in FIG. 6.

In some embodiments, subject 502 may be any subject matter of multispectral image data captured by imaging device(s) 504 and/or may be any subject matter of multispectral image data supplied to database 506 by other means. In some embodiments, subject 502 may share any one or more characteristics in common with subject 302 as discussed above with reference to FIG. 3.

In some embodiments, imaging device(s) 504 may comprise any one or more multispectral imaging devices, stereo rigs, or commercially available off-the-shelf imaging devices configured to capture image data at a plurality of predetermined wavelength ranges. Imaging device(s) 504 may share any one or more characteristics in common with imaging device(s) 304 as discussed above with reference to FIG. 3. In some embodiments, different imaging devices may be used to capture images at different wavelength ranges, and the distinct images of the same subject may thereafter be associated with one another in order to form the multispectral image data transmitted to multispectral image data database 506.

In some embodiments, multispectral image data database 506 may be any computer database, memory, or other transitory or non-transitory storage medium capable of storing digital multispectral image data. In some embodiments, multispectral image data database 506 and the multispectral image data stored thereon may share any one or more characteristics, respectively, with multispectral image data database 306 and the multispectral image data stored thereon as discussed above with reference to FIG. 3. As shown, database 506 may be communicatively coupled to imaging device(s) 504 such that it may receive multispectral image data, and it may be communicatively coupled and configured to provide multispectral image data to multispectral image comparison tool 516, multispectral image hallucination tool 520, and hallucinated image comparison tool 526.

In some embodiments, multispectral image hallucination tool 520 may be any one or more computer processors configured to execute instructions in order to perform the image hallucination methods discussed in greater detail below with respect to method 600 in FIG. 6. As shown, tool 520 may be communicatively coupled to database 506 to receive multispectral image data of at least a plurality of wavelength ranges, and may be communicatively coupled to multispectral image comparison tool 520 to transmit a hallucinated image 522 to tool 520.

In some embodiments, multispectral image comparison tool 516 may be any one or more computer processors configured to execute instructions in order to perform the image comparison methods discussed in greater detail below with respect to method 600 in FIG. 6. In some embodiments, multispectral image comparison tool 516 may share any one or more characteristics in common with comparison tool 316 discussed above with respect to FIG. 3; whereas tool 316 may be configured in system 300 to receive and compare multispectral image data, tool 516 may be configured in system 500 to receive both multispectral image data and hallucinated image data that predicts/estimates multispectral image data, as discussed further below with respect to method 600 of FIG. 6.

As shown, tool 516 may be communicatively coupled to multispectral image comparison similarity metric output device 518, such that tool 516 may send data to output device 518 that enables output device 518 to generate one or more reports, alerts, alarms, indicators, or the like indicating one or more calculated similarity metrics, the estimated presence or absence of an anomaly, and/or the estimated presence or absence of a presentation attack. In some embodiments, output device 518 may share any one or more characteristics in common with output device 318 discussed above with respect to FIG. 3.

In some embodiments, hallucinated image comparison tool 526 may be any one or more computer processors configured to execute instructions in order to perform the hallucinated image comparison methods discussed in greater detail below with respect to method 600 in FIG. 6. As shown, tool 526 may be communicatively coupled to database 506 to receive multispectral image data of one or more wavelength ranges (e.g., image 524) and may be communicatively coupled to multispectral image hallucination tool 520 to receive a hallucinated image 522 from tool 520. In some embodiments, comparison tool 526 may share one or more characteristics in common with comparison tool 516, where tool 526 may be configured to compare a hallucinated image to a real image of the same wavelength range in a similar manner that tool 516 may be configured to compare a genuine image of one wavelength range to another genuine image of a different wavelength range. Like tool 516, tool 526 may be configured to generate a similarity metric, based on the comparison, that indicates a probability the two compared images are attributable to the same subject. In the case of tool 526, a high similarity metric may indicate that system 500 has determined that it is highly likely that genuine image 524 is attributable to the same subject as the genuine images at different wavelengths on which the creation of hallucinated image 522 was based.

In some embodiments, hallucinated image similarity metric output device 528 may be any output device communicatively coupled to tool 526 and configured to receive data indicative of a similarity metric from tool 526, and further configured to generate one or more reports, alerts, alarms, indicators, or the like indicating the one or more calculated similarity metrics, the estimated presence or absence of an anomaly, and/or the estimated presence or absence of a presentation attack. In some embodiments, output device 526 may share any one or more characteristics in common with output device 518.

In some embodiments, hallucinated image comparison spatial map generator tool may be any one or more computer processors configured to execute instructions in order to perform the spatial map generation techniques discussed below with respect to with respect to method 600 in FIG. 6. As shown, tool 526 may be communicatively coupled to tool 526 in order to receive data indicative of a similarity metric from tool 526 and/or in order to receive image 522 and/or image 524 from tool 526.

Figure 6:
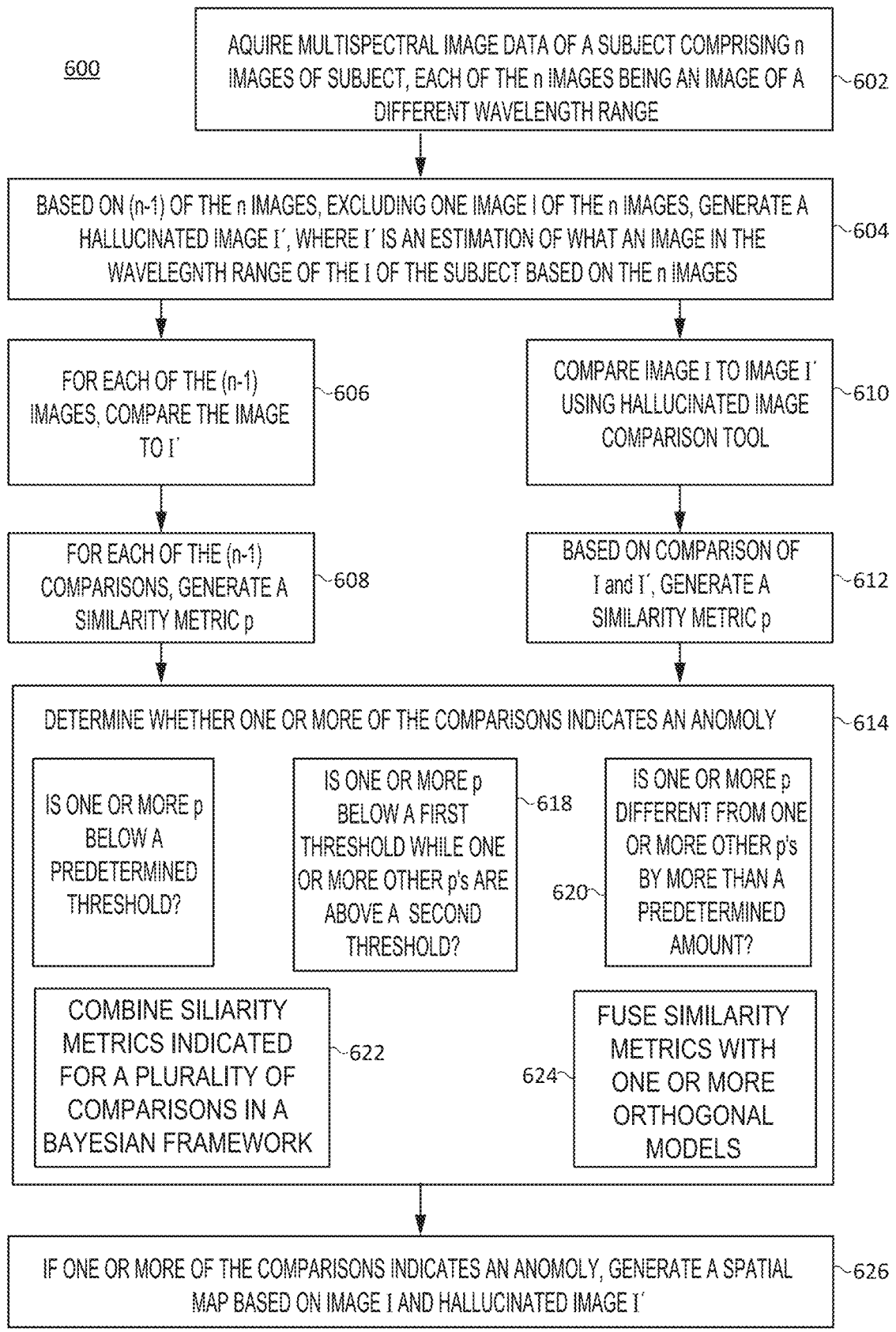
FIG. 6 shows a method for using multispectral image data to determine whether a subject of the multispectral image data represents an anomaly, in accordance with some embodiments.

FIG. 6 shows a method for using multispectral image data to determine whether a subject of the multispectral image data represents an anomaly, in accordance with some embodiments.

At block 602, in some embodiments, the system acquires multispectral image data of a subject. In some embodiments, the multispectral image data of the subject comprises n images of the subject, wherein each of the n images is an image representing a different wavelength range. In the example of system 500 of FIG. 5, system 500 may acquire multispectral image data of subject 502, and the multispectral image data may be stored in database 506.

In some embodiments, the system may receive the multispectral image data via an imaging device such as imaging device(s) 504, which may capture images of subject 502. In some embodiments, the system may receive the multispectral image data from one or more preexisting public and/or private datasets or data sources.

In some embodiments, the multispectral image data received by the system may be aligned before it is received, while in some embodiments it may not be aligned before it is received. If the data is not pre-aligned when it is received by the system, then the system may align the data (e.g., align the different images comprising the multispectral image data) into an aligned spectral cube representing the multispectral image of the subject.

In some embodiments, the multispectral image data of the subject may comprise n images of the subject, wherein each of the n images is an image representing a different wavelength range.

At block 604, in some embodiments, the system generates a hallucinated image. In some embodiments, the system may generate a hallucinated image I', wherein the hallucinated image I' is generated based on (n−1) of the n images, where the (n−1) images include each of the n images of the multispectral image data except one image I. The hallucinated image I' may be an estimation of what an image in the same wavelength range as the image I is expected to look like based on the other (n−1) images of the multispectral image data.

In the example of system 500 of FIG. 5, hallucinated image 522 is generated based on (n−1) of the n images of a spectral cube of the multispectral data representing subject 502 and stored in database 506. The hallucinated image 522 is a prediction, based on the (n−1) images, of what the one other image in the spectral cube, image 524, is expected to look like based on all of the other images in the spectral cube.

In some embodiments, the hallucinated image may be generated by a multispectral image hallucination tool such as tool 520 of system 500. Multispectral image hallucination tools may, in some embodiments, generate a hallucinated image by leveraging one or more statistical models configured to generate an estimated image (e.g., a hallucinated image) at a predetermined wavelength range, such that the estimated image is best supported by the images at all other wavelength ranges for a subject. In some embodiments, these statistical models may share one or more characteristics in common with the statistical models discussed above with reference to method 200 of FIG. 2.

As discussed above, the statistical models applied by the multispectral image hallucination tool may be configured to receive, as input, images from a plurality of wavelength ranges for the same subject and to generate, as output, a single hallucinated image that best approximates or estimates the likely appearance of the same subject at a wavelength range not included in the input images, wherein the generated hallucinated image is the appearance at the hallucinated wavelength range that is determined by the system to be most consistent with each of the input images.

In some embodiments, multispectral image hallucination tool may leverage one or more auto-encoder network architectures configured to generate the hallucinated image at the predetermined wavelength range, wherein the auto-encoder may comprise CNNs. In some embodiments, the auto-encoders may process the plurality of images from the spectral cube through a semantic space of the auto-encoder in order to generate the hallucinated image.

At block 606, in some embodiments, for each of the individual original images used to create the hallucinated image, the system may compare the hallucinated image to the individual original image using a multispectral image comparison tool. In the example of system 500 of FIG. 5, the multispectral image comparison tool may be tool 516. In some embodiments, the multispectral image comparison tool used to compare the hallucinated image to original/genuine image data may share some or all characteristics in common with the multispectral image comparison tools used, as discussed above, to compare a pair of original images to one another, such as tool 316 of FIG. 3. In some embodiments, the same multispectral image comparison tool may be used to compare pairs of original/genuine images to one another and to also compare hallucinated images to genuine images. Put another way, the comparison of the hallucinated image to the original genuine images may be performed simply by treating the hallucinated image as if it were a genuine image at the wavelength range for which the hallucination was generated (e.g., if it is a hallucinated UV image, the system may treat the hallucinated image as a genuine UV image of a spectral cube). The multispectral image comparison tool may thus perform the comparisons of the hallucinated image to each of the other images by leveraging statistical models configured to estimate a likelihood that an image from one wavelength range is consistent with an image of the same subject at another wavelength range, in a same or similar manner as explained above with respect to block 404. This comparison technique, as explained above with reference to block 404 in greater detail, may process input image pairs (in this case including one hallucinated image) through Siamese Networks of the comparison tool that are optimized for comparing images of certain respective wavelength-range combinations.

At block 608, in some embodiments, for each of the comparisons of an original image to the hallucinated image, the system may generate a similarity metric based on the respective comparison, wherein the similarity metric may represent the probability that the two compared images in the combination are attributable to the same subject. In some embodiments, the similarity metric and the manner in which it is generated and transmitted/output may share some or all characteristics in common with the similarity metric techniques explained above with reference to block 408 of FIG. 4. In some embodiments, one or more of the similarity metrics may be transmitted to a multispectral image comparison similarity score output device, such as device 518 of system 500, for output, transmission, and/or display.

Attention is now directed to blocks 610 and 612, which may proceed in parallel to blocks 606 and 608. Block 610 may follow, in some embodiments, from block 604.

At block 610, in some embodiments, the system may compare the hallucinated image to the original image, from the multispectral image data, that was not used to create the hallucinated image. Put another way, the system may compare the hallucinated image to the actual, original, genuine image at the same wavelength range. Put yet another way, the system may compare the hallucinated image to the genuine image that the hallucinated image is intended to approximate. In some embodiments, this comparison may be executed by the system using a hallucinated image comparison tool, such as hallucinated image comparison tool 526 of system 500.

In some embodiments, comparisons made by a hallucinated image comparison tool may share one or more characteristics in common with comparisons made by multispectral image comparison tools (e.g., tool 516) as discussed above. For example, a hallucinated image comparison tool may accept as input two different images, and may generate as output a similarity metric indicating a likelihood that the two images are attributable to the same subject. However, rather than being configured to compare two images corresponding to different wavelength ranges, a hallucinated image comparison tool may be configured to compare two images corresponding to the same wavelength range. Accordingly, in some embodiments, a hallucinated image comparison tool may leverage one or more facial image matching algorithms to determine whether the two input images of the same wavelength range (e.g., the hallucinated image and the original image at the same wavelength range) are a "match."

In some embodiments, the hallucinated image comparison tool may be configured to compare the images using a Siamese network trained to compare hallucinated images to original images at the same wavelength to produce a similarity score. The Siamese Network may, in some embodiments, be trained so that pairs of images not representing a presentation attack have a label 1 while pairs of images representing a presentation attack have a label 0. Then traditional supervised learning may be used to correlate same-wavelength pairs to presentation attacks. In some embodiments, face-recognition tools could be used to determine whether the hallucinated image matches the corresponding genuine image. In some embodiments, image differencing techniques may be used to determine whether the hallucinated image matches the corresponding genuine image.

At block 612, in some embodiments, the system may generate a similarity metric based on the comparison of the hallucinated image and the original corresponding image. In some embodiments, the similarity metric may be generated by the hallucinated image comparison tool, and may share any one or more characteristics in common with similarity metrics generated by the comparison of pairs of images by multispectral image comparison tools, such as tool 516, discussed above. In some embodiments, the similarity metric may be a probability between 0 and 1 that the images represent a "match" in that the system has determined that they are likely to represent images of the same subject and/or that the system has determined that they are likely to be the same image.

In some embodiments, the similarity metric and the manner in which it is generated and transmitted/output may share some or all characteristics in common with the similarity metric techniques explained above with reference to block 408 of FIG. 4. In some embodiments, the similarity metric may be transmitted to a hallucinated image similarity metric output device, such as device 528 of system 500, for output, transmission, and/or display.

At block 614, which may follow from block 608 and/or from block 612, in some embodiments, the system may determine whether one or more of the comparisons performed by the system indicates an anomaly. In some embodiments, determining that an anomaly is indicated may comprise determining that the multispectral image data represents a presentation attack. As discussed with respect to FIG. 4, similarity metrics in multispectral image analysis may in some embodiments be used as a trigger or condition for causing a system to take one or more actions, such as generating, transmitting, or outputting an alert; automatically executing further analysis; or storing data regarding the corresponding subject.

In some embodiments, more than one similarity metric may be analyzed together in order to determine whether or not an anomaly is detected. For example, in some embodiments, a network used to perform a comparison may produce a single similarity metric that represents the similarity of the two images compared by that network. That metric may be combined with metrics generated based on comparisons of other pairs of images for the same spectral cube, and each of the metrics may be weighted with respect to one another. For example, in some embodiments, a same-wavelength similarity metric may be considered more important than an individual cross-wavelength similarity metric when making a final determination as to whether the multispectral image data represents an anomaly and/or presentation attack, and the weighting of the various metrics may reflect this assumption (e.g., weight same-wavelength comparisons more heavily).

Below, blocks 616 to 626 explain various techniques by which the system may use one or more similarity metrics (generated at block 608 and/or block 612) to determine whether the subject likely represents an anomaly or a presentation attack. The techniques discussed below may be applied to any one of the similarity metrics generated at block 608 or at 610, or to any plurality of the similarity metrics generated at block 608 and/or block 610. In some embodiments, determining that the subject likely represents an anomaly or a presentation attack may trigger any of the actions discussed above, such as generating, transmitting, or outputting an alert.

At block 616, in some embodiments, determining whether an anomaly is indicated comprises determining whether any similarity metric is less than a predetermined threshold. This analysis may be performed by system 500 in a same or similar manner as discussed above with reference to block 410, such that any one similarity metric being sufficiently low may be determined to indicate that at least two of the genuine and/or hallucinated images are inconsistent with one another and therefore indicate an anomaly and/or a presentation attack.

At block 618, in some embodiments, determining whether an anomaly is indicated comprises determining whether a first similarity metric is less than a first threshold and whether a second similarity metric is greater than a second threshold. This analysis may be performed by system 500 in a same or similar manner as discussed above with reference to block 412, such that a system may be configured to determine that an anomaly is indicated only when a similarity metric for one comparison for a subject indicates a low confidence of a match while one or more other similarity metrics for one or more other comparisons of the same subject simultaneously indicates high confidence of a match.

At block 620, in some embodiments, determining whether an anomaly is indicated comprises determining whether a first similarity metric differs from a second similarity metric by more than a predetermined threshold difference. This analysis may be performed by system 500 in a same or similar manner as discussed above with reference to block 414, such that a system may recognize, as indicative of an anomaly and/or presentation attack, situations in which one or more comparisons for a subject indicate substantially different probabilities for matching than other comparisons for the same subject.

At block 622, in some embodiments, determining whether an anomaly is indicated may comprise combining similarity metrics indicated for a plurality of comparisons in a Bayesian framework. For example, the process of blocks 604-620 explained above may be executed for a hallucinated image at each wavelength range for each spectral cube, such that a plurality of probability metrics may be calculated for multiple hallucinated images at different wavelength ranges for each spectral cube analyzed by the system. Evidence from all of these comparisons in accordance with any or all of the comparison techniques explained herein may then be combined in a Bayesian framework to estimate the overall likelihood of an anomaly and/or presentation attack. For example, the likelihood of an anomaly (e.g., a presentation attack) in light of a plurality of observations may in some embodiments be modeled as a set of Bayesian equations P(PA given X), where X is a single observation (e.g., the similarity metric output by a single pair-wise comparison of two images of the multispectral image data). Bayes theorem says P(PA given X)=P(X given PA)*P(PA)/P(X), where P(PA) is the probability of a presentation attack occurring at all, which may be modelled from a sample population. P(X given PA) is the probability that the observation X would be observed in situations in which it is known the there is a presentation attack. The term P(X given PA) may be thought of as essentially a weight or confidence in this wavelength combination; in some embodiments, it could be determined based on a sample population. Finally, P(X) is the probability that this observation would occur, which may also be estimated, for example based on a sample population and/or training data. The output of each individual Bayesian equation may be a normalized probability that a presentation attack is present, and these outputs may be averaged or otherwise combined to generate a final score or metric estimating the likelihood of an anomaly or presentation attack.

At block 624, in some embodiments, determining whether an anomaly is indicated may comprise fusing similarity metrics with one or more orthogonal models that augment the cross-spectral analysis. In some embodiments, similarity metrics may be fused with the input from orthogonal sensors that collect data such as EKG, chemical spectroscopy, galvanic response, or other data collected from non-imaging sensors. For example, while each model in a Siamese ensemble may return an individual probability that a presentation attack is present in the sample, each modality may additionally have a set of orthogonal models that augments this cross-spectral approach. A final probability of a presentation attack may, in some embodiments, be estimated on the basis of the combination of all of the scores. In some embodiments, estimating the final probability of a presentation attack by using orthogonal models may include using a CNN capable of learning second-order interactions between the cross-spectral approaches described herein and orthogonal data to estimate the probability of an anomaly and/or presentation attack. In some embodiments, estimating the final probability of a presentation attack by using orthogonal models may include using a Bayesian framework to consider the imaging data and the orthogonal data together.

At block 626, in some embodiments, if one or more of the comparisons indicates an anomaly, the system may generate a spatial map based on the hallucinated image and the corresponding genuine image. In some embodiments, a spatial map may be generated by a spatial map generation tool, such as tool 530, which may include one or more processors capable of executing instructions to generate a spatial map in accordance with the techniques explained herein, and which may further be configured to store, transmit, and/or display the generated spatial map(s).

In some embodiments, generating a spatial map may go beyond detecting and reporting a single measurement of the likelihood of a presentation attack, and may instead take advantage of the inherently spatial nature of the techniques described herein to provide analysts with an interpretable portrayal of the evidence behind underpinning the analysis and decisions made by the system. In some embodiments, an interpretable visual portrayal may include a high-resolution heat map overlay indicating one or more regions or areas of a sample that may be associated with a suspected anomaly and/or presentation attack. Spatial maps may not only provide useful guidance during secondary inspection, they may also facilitate assembling a catalog of such imagery illustrating both known attacks and common false positives in order to further assist analyst review.

In some embodiments, the techniques explained above may be combined with additional approaches for fusion that make use of the spatial information from neighboring patches used in prediction model, including those drawn from color edge detection and 2D Markov Random Fields.

In some embodiments, the techniques explained above may be combined with techniques for classification and stable feature identification (SFI) in the iris modality. Regarding classification for the iris modality, it has been shown that while the standard Daugman approach may perform well when the gallery and probe are both collected in the NIR band, cross-spectral matching using Daugman's algorithm may results in a lower match score.

Accordingly, the standard Daugman algorithm may be a starting point for exploring cross-spectral matching. More specifically, in the traditional paradigm developed by Daugman, the difference between two iris image codes is expressed in terms of the Hamming distance between these codes. The smaller the distance between a pair of codes, the more likely they are to be from the same iris. Non-zero Hamming distances from different images of the same iris collected at the same wavelength exist primarily due to resolution, sensor noise, occlusions such as specular reflections, eyelids, eyelashes, and pupil diameter effects. When the wavelength of one image changes, the error rate increases since measurements at different wavelengths achieve different levels of penetration in the iris. The degradation in classification performance may be systematically characterized as a function of spectral mismatch for use in the techniques disclosed herein, where it is expected that significant variations to the expected cross-spectral match may provide evidence of a presentation attack.

Regarding SFI in the iris modality, certain parts of the iris may exhibit volatile behavior over a short period of time even under normal conditions. Thus, temporal information may be used to determine the most stable and robust features. This approach may be expanded to detect presentation attack materials (e.g. cosmetic contact lenses), as their stable features may differ from those of a real iris. In particular, presentation attack features may vary as a function of presentation attack and collection condition.

The SFI process may start with a normalization step where each iris in the input sequence is initially segmented and aligned with one another. Features may be computed for each normalized iris data and quantized based on the complex phasor data. Since the iris data is aligned, each pixel may be represented by a vector of complex feature measurements. The stability of the features at each pixel may be computed based on a volatility index metric, and a stability map may be generated.

The robustness of iris recognition to distortions is a function of the stability of features represented by the complex phasor data in the presence of those distortions. Each feature may be encoded by its location in one of the four quadrants in the complex axes. In a sequence of iris images, stable features may generally be located in the same quadrant while unstable features may oscillate between quadrants. Additionally, stable features may be quantified by the variability of the phasor angle at each pixel.

In some embodiments, SFI may make no pre-determined assumptions about the degree of image volatility, but may use the actual data from the image sequence to adaptively select the most stable features. While the feature stability of a real iris may vary in distinct ways over time, presentation attacks such as cosmetic contact lenses may create additional stable features since the lens may limit the type and amount of iris variation possible over time.

Figure 7:
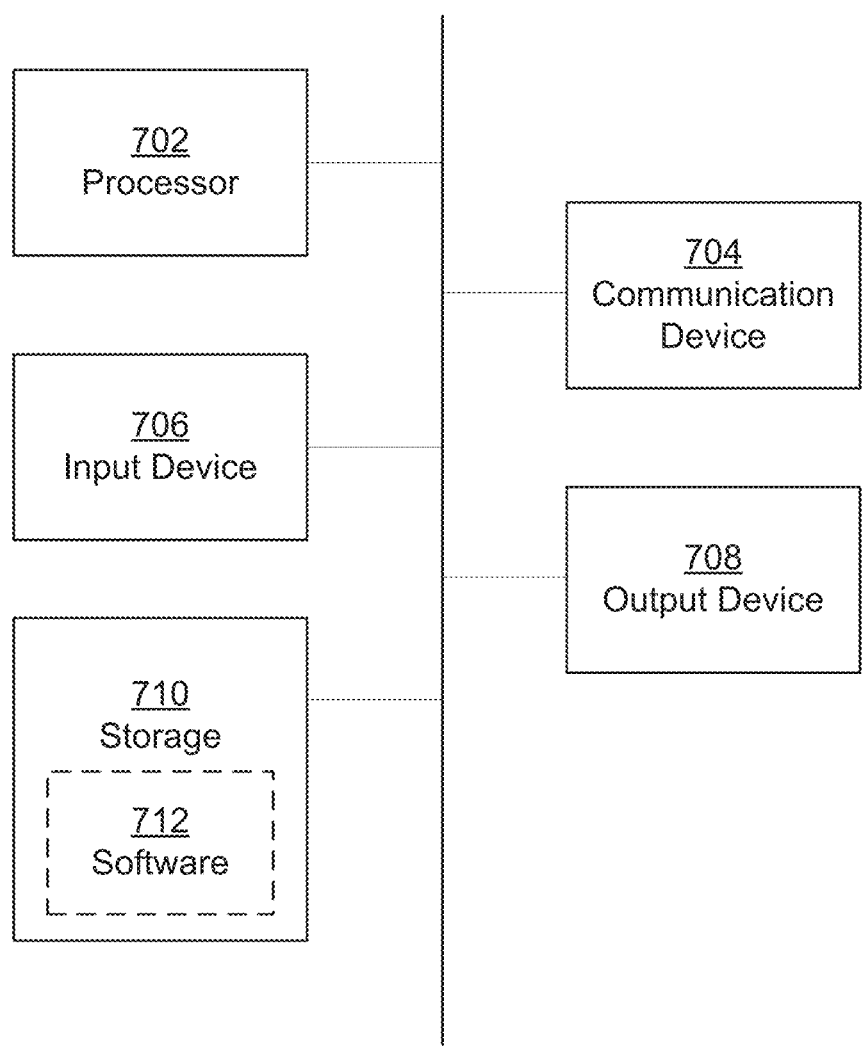
FIG. 7 shows a computer system in accordance with some embodiments.

An example of a computer system for performing one or more of the multispectral image analysis techniques disclosed here (e.g., feature extraction, image hallucination, image comparison, etc.) according to some embodiments is illustrated by system 700 in FIG. 7. As shown in FIG. 7, system 700 can be any suitable type of microprocessor-based device, such as a personal computer, workstation, server, handheld computing device, such as a phone or tablet, or distributed computing system (e.g., cloud computing system). The system can include, for example, one or more of processor 702, communication device 704, input device 706, output device 708, storage 710, and/or software 712 stored on storage 710 and executable by processor 702. The components of the computer can be connected in any suitable manner, such as via one or more physical buses or wirelessly.

In some embodiments, system 700 may include server-side computing components as well as client-side computing components. The specific elements shown in FIG. 7 may, in some embodiments, be included in a server-side computer and/or may, in some embodiments, be included in a client-side computer. In some embodiments, system 700 may include server-side components and client-side components that are in communication with one another via one or more instances of communication device 704, which may, for example, enable communication of server-side components and client-side components over a network connection.

In some embodiments, some or all components of system 700 may be part of a distributed computing system (e.g., a cloud computing system). In some embodiments of the techniques disclosed herein, for example, storage 710 may be storage provisioned by a cloud computing system, such that a user may send instructions to the cloud computing system over one or more network connections, and the cloud computing system may execute the instructions in order to leverage the cloud computing components in accordance with the instructions. In some embodiments, cloud computing systems may be configured to be capable of executing the same or similar program code in the same programming languages as other systems (e.g., servers, personal computers, laptops, etc.) as discussed herein.

Processor 702 may be any suitable type of computer processor capable of communicating with the other components of system 700 in order to execute computer-readable instructions and to cause system 700 to carry out actions in accordance with the instructions. For example, processor 700 may access a computer program (e.g., software 712) that may be stored on storage 710 and execute the program to cause the system to perform various actions in accordance with the program. In some embodiments, a computer program or other instructions executed by processor 702 may be stored on any transitory or non-transitory computer-readable storage medium readable by processor 702.

Communication device 704 may include any suitable device capable of transmitting and receiving signals over a network, such as a network interface chip or card. System 700 may be connected to a network, which can be any suitable type of interconnected communication system. The network can implement any suitable communications protocol and can be secured by any suitable security protocol. The network can comprise network links of any suitable arrangement that can implement the transmission and reception of network signals, such as wireless network connections, T1 or T3 lines, cable networks, DSL, or telephone lines.

Input device 706 may be any suitable device that provides input, such as a touch screen or monitor, keyboard, mouse, button or key or other actuatable input mechanism, microphone, and/or voice-recognition device, gyroscope, camera, or IR sensor. Output device 708 may be any suitable device that provides output, such as a touchscreen, monitor, printer, disk drive, light, speaker, or haptic output device.

Storage 710 can be any suitable device the provides storage, such as an electrical, magnetic or optical memory including a RAM, cache, hard drive, CD-ROM drive, tape drive, or removable storage disk.

Software 712, which may be stored in storage 710 and executed by processor 702, may include, for example, the programming that embodies the functionality of the methods, techniques, and other aspects of the present disclosure (e.g., as embodied in the computers, servers, and devices as described above). In some embodiments, software 712 may include a combination of servers such as application servers and database servers.

Software 712 can also be stored and/or transported within any computer-readable storage medium for use by or in connection with an instruction execution system, apparatus, or device, such as those described above, that can fetch instructions associated with the software from the instruction execution system, apparatus, or device and execute the instructions. In the context of this disclosure, a computer-readable storage medium can be any medium, such as storage 710, that can contain or store programming for use by or in connection with an instruction execution system, apparatus, or device.

Software 712 can also be propagated within any transport medium for use by or in connection with an instruction execution system, apparatus, or device, such as those described above, that can fetch instructions associated with the software from the instruction execution system, apparatus, or device and execute the instructions. In the context of this disclosure, a transport medium can be any medium that can communicate, propagate, or transport programming for use by or in connection with an instruction execution system, apparatus, or device. The transport readable medium can include, but is not limited to, an electronic, magnetic, optical, electromagnetic, or infrared wired or wireless propagation medium.

System 700 can implement any one or more operating systems suitable for operating on the network. Software 712 can be written in any one or more suitable programming languages, such as C, C++, Java, or Python. In various embodiments, application software embodying the functionality of the present disclosure can be deployed in different configurations, such as in a client/server arrangement or through a Web browser as a Web-based application or Web service, for example.

Although the description herein uses terms first, second, etc., to describe various elements, these elements should not be limited by the terms. These terms are only used to distinguish one element from another.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

What is claimed is:

1. A method for generating network architectures for biometric security, the method comprising:
    at a system comprising one or more processors and a memory:
        receiving multispectral training image data comprising, for each subject of a plurality of subjects, multispectral image data comprising a plurality of images of the subject, each of the plurality of images for each subject being an image at a different wavelength range;
        for each of the plurality of subjects, aligning the corresponding plurality of images into a respective multispectral cube representing the multispectral image data for the respective subject;
        extracting features from the multispectral training image data; and
        generating and storing, based on the extracted features, a network architecture for predicting relationships of multispectral images of a subject, wherein:
            the network architecture comprises an auto-encoder network architecture comprising a plurality of convolutional neural networks; and
            the network architecture is configured to generate an estimation of a first image of a subject at a first wavelength range based on a plurality of images of the subject at a respective plurality of wavelength ranges different from the first wavelength range.

2. The method of claim 1, wherein extracting features from the multispectral training image data comprises dividing images in the multispectral training image data into a plurality of regional patches.

3. The method of claim 1, wherein extracting features from the multispectral training image data comprises training one or more convolutional neural networks trained to characterize texture and structure in multispectral image data.

4. The method of claim 1, wherein extracting features from the multispectral training image data comprises using a layer of a classifier network as a feature vector.

5. The method of claim 1, wherein extracting features from the multispectral training image data comprises using a wavelet filter bank comprising a plurality of filters.

6. The method of claim 5, wherein extracting features from the multispectral training image data comprises using a subset of the plurality of filters that has been determined to optimize performance for a predetermined combination of two wavelength ranges.

7. The method of claim 1, wherein extracting features from the multispectral training image data comprises extracting the features using tensor dictionaries containing multilinear mappings over a set of vector spaces.

8. The method of claim 7, wherein the multilinear mappings are hierarchical part-based tensorfaces.

9. The method of claim 1, wherein:
    the network architecture comprises a Siamese network comprising an ensemble of convolutional neural networks; and
    the network architecture is configured to estimate a likelihood that a first image of a subject at a first wavelength range is consistent with a second image of a subject at a second wavelength range.

10. A system for generating network architectures for biometric security, the system comprising one or more processors and a memory, wherein the one or more processors are configured to execute instructions stored on the memory to cause the system to:
    receive multispectral training image data comprising, for each subject of a plurality of subjects, multispectral image data comprising a plurality of images of the subject, each of the plurality of images for each subject being an image at a different wavelength range;
    for each of the plurality of subjects, align the corresponding plurality of images into a respective multispectral cube representing the multispectral image data for the respective subject;
    extract features from the multispectral training image data; and
    generate and store, based on the extracted features, a network architecture for predicting relationships of multispectral images of a subject, wherein:
        the network architecture comprises an auto-encoder network architecture comprising a plurality of convolutional neural networks; and
        the network architecture is configured to generate an estimation of a first image of a subject at a first wavelength range based on a plurality of images of the subject at a respective plurality of wavelength ranges different from the first wavelength range.

11. A non-transitory computer-readable storage medium storing one or more programs for generating network architectures for biometric security, the one or more programs configured to be executed by one or more processors communicatively coupled to one or more processors of a system, the one or more programs including instructions to cause the system to:
    receive multispectral training image data comprising, for each subject of a plurality of subjects, multispectral image data comprising a plurality of images of the subject, each of the plurality of images for each subject being an image at a different wavelength range;
    for each of the plurality of subjects, align the corresponding plurality of images into a respective multispectral cube representing the multispectral image data for the respective subject;
    extract features from the multispectral training image data; and generate and store, based on the extracted features, a network architecture for predicting relationships of multispectral images of a subject, wherein:
the network architecture comprises an auto-encoder network architecture comprising a plurality of convolutional neural networks; and
the network architecture is configured to generate an estimation of a first image of a subject at a first wavelength range based on a plurality of images of the subject at a respective plurality of wavelength ranges different from the first wavelength range.

\* \* \* \* \*